US012083804B2

(12) United States Patent
Tokisawa et al.

(10) Patent No.: US 12,083,804 B2
(45) **Date of Patent: *Sep. 10, 2024**

(54) INKJET PRINTING APPARATUS AND CONTROL METHOD OF THE INKJET PRINTING APPARATUS

(71) Applicant: CANON KABUSHIKI KAISHA, Tokyo (JP)

(72) Inventors: Toshiaki Tokisawa, Kawasaki (JP); Yumi Mukoyama, Kawasaki (JP); Kyoshiro Okude, Kawasaki (JP); Takashi Abe, Kawasaki (JP); Takahiro Kiuchi, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,890

(22) Filed: Sep. 19, 2022

(65) Prior Publication Data

US 2023/0081423 A1 Mar. 16, 2023

Related U.S. Application Data

(63) Continuation of application No. 16/936,026, filed on Jul. 22, 2020, now Pat. No. 11,577,522, which is a (Continued)

(30) Foreign Application Priority Data

Jul. 7, 2017 (JP) ................................ 2017-133782

(51) Int. Cl.
*B41J 2/175* (2006.01)
*B41J 2/165* (2006.01)
(Continued)

(52) U.S. Cl.
CPC ....... *B41J 2/17596* (2013.01); *B41J 2/16505* (2013.01); *B41J 2/175* (2013.01); (Continued)

(58) Field of Classification Search
CPC ..... B41J 2/17596; B41J 2/16505; B41J 2/175
See application file for complete search history.

(56) References Cited

U.S. PATENT DOCUMENTS

| | | | | |
|---|---|---|---|---|
| 8,210,666 | B2 | 7/2012 | Hirashima | 347/85 |
| 8,616,690 | B2 | 12/2013 | Saito et al. | 347/92 |

(Continued)

FOREIGN PATENT DOCUMENTS

| | | |
|---|---|---|
| CN | 101468547 | 7/2009 |
| CN | 101638006 | 2/2010 |

(Continued)

OTHER PUBLICATIONS

Office Action dated May 10, 2022 in counterpart Japanese Application No. 2018-129297, together with English translation thereof.

(Continued)

*Primary Examiner* — Lam S Nguyen
(74) *Attorney, Agent, or Firm* — Venable LLP

(57) ABSTRACT

According to an aspect of the present invention, an inkjet printing apparatus includes a print head having an ejection opening surface on which ejection openings for ejecting ink are formed, a tank storing ink to be supplied to the print head, a supply flow path for supplying the ink from the tank to the print head, a collection flow path for collecting the ink from the print head to the tank, a supply pump provided in the supply flow path to supply the ink from the tank to the print head, a tank decompression pump which decompresses the inside of the tank, and a control unit which controls to drive the supply pump and the tank decompression pump to fill the collection flow path with ink.

53 Claims, 22 Drawing Sheets

Related U.S. Application Data continuation of application No. 16/022,311, filed on Jun. 28, 2018, now Pat. No. 10,759,181.

(51) Int. Cl.

| | |
|---|---|
| ***B41J 2/18*** | (2006.01) |
| ***B41J 2/245*** | (2006.01) |
| ***B41J 29/02*** | (2006.01) |
| ***B41J 29/38*** | (2006.01) |

(52) U.S. Cl.

CPC ............. *B41J 2/17566* (2013.01); *B41J 2/18* (2013.01); *B41J 2/245* (2013.01); *B41J 29/02* (2013.01); *B41J 29/38* (2013.01); *B41J 2002/17579* (2013.01)

(56) References Cited

U.S. PATENT DOCUMENTS

| | | | | |
|---|---|---|---|---|
| 9,079,408 | B2 | 7/2015 | Suzuki et al. | B41J 2/16585 |
| 9,242,475 | B2 | 1/2016 | Otsuka et al. | B41J 2/19 |
| 9,333,754 | B2 | 5/2016 | Ishii et al. | B41J 2/16523 |
| 9,365,045 | B2 | 6/2016 | Shibata | B41J 2/17566 |
| 9,731,512 | B2 | 8/2017 | Ueda et al. | B41J 2/17596 |
| 9,738,081 | B2 | 8/2017 | Kimura et al. | B41J 2/17509 |
| 10,336,085 | B2 | 7/2019 | Arai et al. | B41J 2/18 |
| 10,357,977 | B2 | 7/2019 | Mukoyama et al. | B41J 2/175 |
| 10,538,096 | B2 | 1/2020 | Abe et al. | B41J 2/17596 |
| 2005/0052513 | A1 | 3/2005 | Inoue | 347/89 |
| 2008/0218554 | A1 | 9/2008 | Inoue | 347/33 |
| 2009/0091779 | A1 | 4/2009 | Ishinaga et al. | 358/1.15 |
| 2009/0160887 | A1 | 6/2009 | Hamazaki et al. | 347/7 |
| 2009/0295881 | A1 | 12/2009 | Tasaka et al. | 347/85 |
| 2010/0026739 | A1 | 2/2010 | Hirashima | 347/6 |
| 2010/0045733 | A1 | 2/2010 | Mano | 347/29 |
| 2010/0157002 | A1 | 6/2010 | Takada et al. | 347/85 |
| 2012/0188316 | A1 | 7/2012 | Matsuoka et al. | 347/89 |
| 2013/0050309 | A1 | 2/2013 | Koike et al. | 347/6 |
| 2013/0076829 | A1 | 3/2013 | Yamamoto | 347/32 |
| 2013/0208048 | A1 | 8/2013 | Kritchman et al. | 347/32 |
| 2014/0055525 | A1 | 2/2014 | Kritchman et al. | 347/33 |
| 2014/0218438 | A1 | 8/2014 | Shinkai | 347/30 |
| 2014/0246510 | A1 | 9/2014 | Albertin et al. | 239/11 |
| 2017/0057241 | A1 | 3/2017 | Ueda et al. | B41J 2/17596 |
| 2017/0106661 | A1 | 4/2017 | Ueda et al. | B41J 2/17566 |
| 2017/0305163 | A1 | 10/2017 | Kimura et al. | B41J 2/17509 |
| 2017/0326882 | A1 | 11/2017 | Okude et al. | B41J 2/01 |
| 2019/0009557 | A1 | 1/2019 | Arai et al. | B41J 2/17509 |
| 2019/0009561 | A1 | 1/2019 | Mukoyama et al. | B41J 2/1752 |
| 2019/0009562 | A1 | 1/2019 | Abe et al. | B41J 2/16505 |

FOREIGN PATENT DOCUMENTS

| | | |
|---|---|---|
| CN | 101746148 | 6/2010 |
| CN | 103826862 | 5/2014 |
| CN | 103963470 | 8/2014 |
| CN | 105946362 | 9/2016 |
| CN | 106476442 | 3/2017 |
| EP | 2127883 | 12/2009 |
| EP | 2574469 | 4/2013 |
| EP | 2977210 | 1/2016 |
| JP | H06-8467 | 1/1994 |
| JP | 2006-218703 | 8/2006 |
| JP | 2009-292121 | 12/2009 |
| JP | 2010-155449 | 7/2010 |
| JP | 2011-189658 | 9/2011 |
| JP | 2013-043314 | 3/2013 |
| JP | 2013-071331 | 4/2013 |
| JP | 2014-180828 | 9/2014 |
| JP | 2015-147365 | 8/2015 |
| JP | 2015-168139 | 9/2015 |
| JP | 2017-043050 | 3/2017 |
| WO | 2015/022833 | 2/2015 |

OTHER PUBLICATIONS

Extended European Search Report dated Nov. 19, 2018 in counterpart European Application No. 18180604.3.

Office Action dated Mar. 25, 2020 in counterpart Chinese Application No. 201810736720.2, with English translation.

INKJET PRINTING APPARATUS AND CONTROL METHOD OF THE INKJET PRINTING APPARATUS

This application is a continuation of application Ser. No. 16/936,026 filed Jul. 22, 2020, currently pending, which was a continuation of application Ser. No. 16/022,311 filed Jun. 28, 2018, now issued as U.S. Pat. No. 10,759,181 on Sep. 1, 2020; and claims priority under 35 U.S.C. § 119 to Japan Application No. 2017-133782 filed on Jul. 7, 2017; and the contents of all of which are incorporated herein by reference as if set forth in full.

BACKGROUND OF THE INVENTION

Field of the Invention

The present invention relates to an inkjet printing apparatus comprising a print head that ejects ink to print an image and a control method of the inkjet printing apparatus.

Description of the Related Art

Conventionally, there has been an inkjet printing apparatus using an ink circulation system for circulating ink between an ink tank and a print head. Such an inkjet printing apparatus has a supply path for supplying ink from the ink tank to the print head and a return path for returning ink from the print head to the ink tank in order to circulate ink. Japanese Patent Laid-Open No. 2010-155449 discloses that in a printing apparatus using an ink circulation system, ink is filled by driving a supply pump provided in an ink supply path and a return pump provided in an ink return path.

However, it may take time to fill ink depending on the configuration of an ink supply path and return path. For example, in a case where an ink supply path and return path are elongated and flow resistance increases due to restrictions on the configuration of a printing apparatus, it may take time to fill ink by driving a supply pump provided in the supply path and a return pump provided in the return path.

The present invention has been accomplished in order to solve the above problem. An object of the present invention is to reduce time required to fill ink in an inkjet printing apparatus using an ink circulation system.

SUMMARY OF THE INVENTION

In order to solve the above problem, according to an aspect of the present invention, an inkjet printing apparatus includes a print head having an ejection opening surface on which ejection openings for ejecting ink are formed, a tank storing the ink to be supplied to the print head, a supply flow path for supplying the ink from the tank to the print head, a collection flow path for collecting the ink from the print head to the tank, a supply pump provided in the supply flow path to supply the ink from the tank to the print head, a tank decompression pump which decompresses the inside of the tank, and a control unit which controls to drive the supply pump and the tank decompression pump to fill the collection flow path with the ink.

Further features of the present invention will become apparent from the following description of exemplary embodiments with reference to the attached drawings.

BRIEF DESCRIPTION OF THE DRAWINGS

FIGS. 14A through 14G are diagrams showing states of the upstream flow path in the case of filling the relief flow path with ink, in which: FIG. 14A shows a state of the upstream flow path in which the supply pump is driven with the supply valve and head replacement valve opened; FIG. 14B shows a state of the upstream flow path in which the head replacement valve is closed after the state of FIG. 14A; FIG. 14C shows a state of the upstream flow path in which the head replacement valve is opened after the state of FIG. 14B; FIG. 14D shows the upstream flow path in which the supply pump is continuously driven in the state of FIG. 14C; FIG. 14E shows a state of the upstream flow path in which the head replacement valve is closed after the state of FIG. 14D; FIG. 14F shows a state of the upstream flow path in which the head replacement valve is opened after the state of FIG. 14E; and FIG. 14G is a legend explaining symbols used in FIGS. 14A through 14G;

DESCRIPTION OF THE EMBODIMENTS

Figure 1:
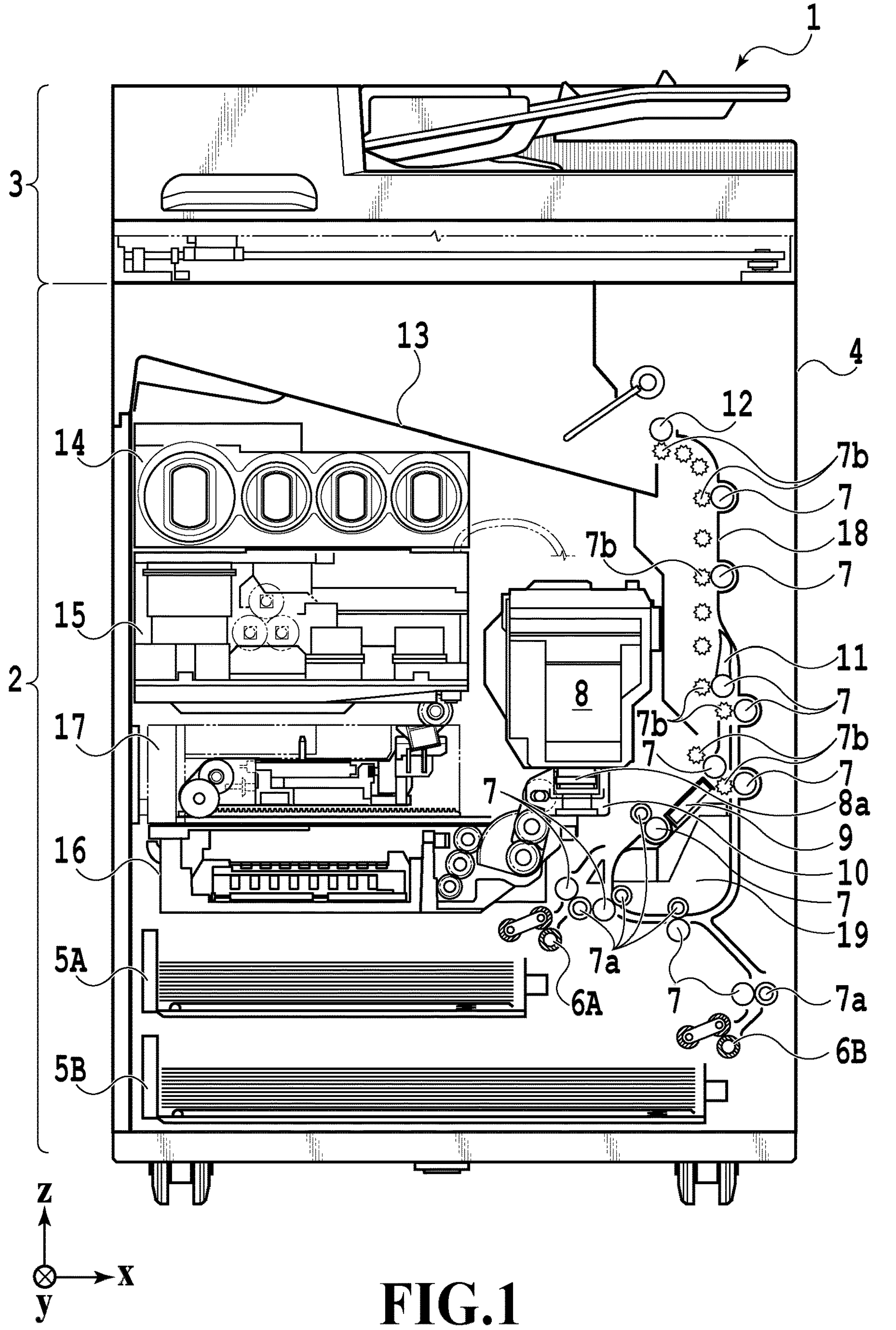
FIG. 1 is a diagram showing a printing apparatus in a standby state.

FIG. 1 is an internal configuration diagram of an inkjet printing apparatus 1 (hereinafter "printing apparatus 1") used in the present embodiment. In the drawings, an x-direction is a horizontal direction, a y-direction (a direction perpendicular to paper) is a direction in which ejection openings are arrayed in a print head 8 described later, and a z-direction is a vertical direction.

The printing apparatus 1 is a multifunction printer comprising a print unit 2 and a scanner unit 3. The printing apparatus 1 can use the print unit 2 and the scanner unit 3 separately or in synchronization to perform various processes related to print operation and scan operation. The scanner unit 3 comprises an automatic document feeder (ADF) and a flatbed scanner (FBS) and is capable of scanning a document automatically fed by the ADF as well as scanning a document placed by a user on a document plate of the FBS. The present embodiment is directed to the multifunction printer comprising both the print unit 2 and the scanner unit 3, but the scanner unit 3 may be omitted. FIG. 1 shows the printing apparatus 1 in a standby state in which neither print operation nor scan operation is performed.

In the print unit 2, a first cassette 5A and a second cassette 5B for housing a print medium (cut sheet) S are detachably provided at the bottom of a casing 4 in the vertical direction. A relatively small print medium of up to A4 size is placed flat and housed in the first cassette 5A and a relatively large print medium of up to A3 size is placed flat and housed in the second cassette 5B. A first feeding unit 6A for sequentially feeding a housed print medium is provided near the first cassette 5A. Similarly, a second feeding unit 6B is provided near the second cassette 5B. In print operation, a print medium S is selectively fed from either one of the cassettes.

Conveying rollers 7, a discharging roller 12, pinch rollers 7*a*, spurs 7*b*, a guide 18, an inner guide 19, and a flapper 11 are conveying mechanisms for guiding a print medium S in a predetermined direction. The conveying rollers 7 are drive rollers located upstream and downstream of the print head 8 and driven by a conveying motor (not shown). The pinch rollers 7*a* are follower rollers that are turned while nipping a print medium S together with the conveying rollers 7. The discharging roller 12 is a drive roller located downstream of the conveying rollers 7 and driven by the conveying motor (not shown). The spurs 7*b* nip and convey a print medium S together with the conveying rollers 7 and discharging roller 12 located downstream of the print head 8.

The guide 18 is provided in a conveying path of a print medium S to guide the print medium S in a predetermined direction. The inner guide 19 is a member extending in the y-direction. The inner guide 19 has a curved side surface and guides a print medium S along the side surface. The flapper 11 is a member for changing a direction in which a print medium S is conveyed in duplex print operation. A discharging tray 13 is a tray for placing and housing a print medium S that was subjected to print operation and discharged by the discharging roller 12.

The print head 8 of the present embodiment is a full line type color inkjet print head. In the print head 8, a plurality of ejection openings configured to eject ink based on print data are arrayed in the y-direction in FIG. 1 so as to correspond to the width of a print medium S. When the print head 8 is in a standby position, an ejection opening surface 8*a* of the print head 8 is oriented vertically downward and capped with a cap unit 10 as shown in FIG. 1. In print operation, the orientation of the print head 8 is changed by a print controller 202 described later such that the ejection opening surface 8*a* faces a platen 9. The platen 9 includes a flat plate extending in the y-direction and supports, from the back side, a print medium S subjected to print operation by the print head 8. The movement of the print head 8 from the standby position to a printing position will be described later in detail.

An ink tank unit 14 separately stores ink of four colors to be supplied to the print head 8. An ink supply unit 15 is provided in the midstream of a flow path connecting the ink tank unit 14 to the print head 8 to adjust the pressure and flow rate of ink in the print head 8 within a suitable range. The present embodiment adopts a circulation type ink supply system, where the ink supply unit 15 adjusts the pressure of ink supplied to the print head 8 and the flow rate of ink collected from the print head 8 within a suitable range.

A maintenance unit 16 comprises the cap unit 10 and a wiping unit 17 and activates them at predetermined timings to perform maintenance operation for the print head 8. The maintenance operation will be described later in detail.

Figure 2:
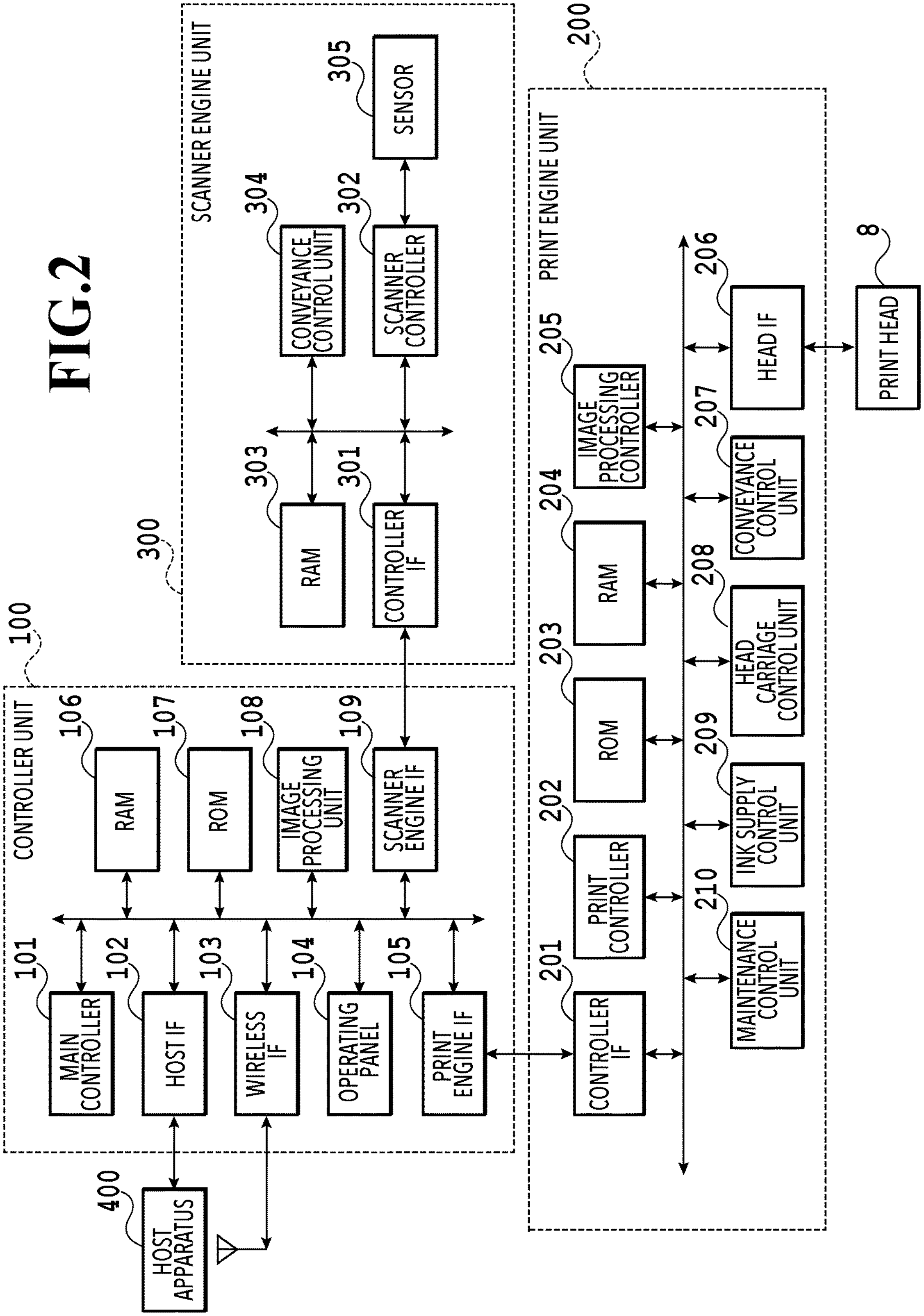
FIG. 2 is a control configuration diagram of the printing apparatus.

FIG. 2 is a block diagram showing a control configuration in the printing apparatus 1. The control configuration mainly includes a print engine unit 200 that exercises control over the print unit 2, a scanner engine unit 300 that exercises control over the scanner unit 3, and a controller unit 100 that exercises control over the entire printing apparatus 1. A print controller 202 controls various mechanisms of the print engine unit 200 under instructions from a main controller 101 of the controller unit 100. Various mechanisms of the scanner engine unit 300 are controlled by the main controller 101 of the controller unit 100. The control configuration will be described below in detail.

In the controller unit 100, the main controller 101 including a CPU controls the entire printing apparatus 1 using a RAM 106 as a work area in accordance with various parameters and programs stored in a ROM 107. For example, when a print job is input from a host apparatus 400 via a host I/F 102 or a wireless I/F 103, an image processing unit 108 executes predetermined image processing for received image data under instructions from the main controller 101. The main controller 101 transmits the image data subjected to the image processing to the print engine unit 200 via a print engine I/F 105.

The printing apparatus 1 may acquire image data from the host apparatus 400 via a wireless or wired communication or acquire image data from an external storage unit (such as a USB memory) connected to the printing apparatus 1. A communication system used for the wireless or wired communication is not limited. For example, as a communication system for the wireless communication, Wi-Fi (Wireless Fidelity; registered trademark) and Bluetooth (registered trademark) can be used. As a communication system for the wired communication, a USB (Universal Serial Bus) and the like can be used. For example, when a scan command is input from the host apparatus 400, the main controller 101 transmits the command to the scanner unit 3 via a scanner engine I/F 109.

An operating panel 104 is a mechanism to allow a user to do input and output for the printing apparatus 1. A user can give an instruction to perform operation such as copying and scanning, set a print mode, and recognize information about the printing apparatus 1 via the operating panel 104.

In the print engine unit 200, the print controller 202 including a CPU controls various mechanisms of the print unit 2 using a RAM 204 as a work area in accordance with various parameters and programs stored in a ROM 203. When various commands and image data are received via a controller I/F 201, the print controller 202 temporarily stores them in the RAM 204. The print controller 202 allows an image processing controller 205 to convert the stored image data into print data such that the print head 8 can use it for print operation. After the generation of the print data, the print controller 202 allows the print head 8 to perform print operation based on the print data via a head I/F 206. At this time, the print controller 202 conveys a print medium S by driving the feeding units 6A and 6B, conveying rollers 7, discharging roller 12, and flapper 11 shown in FIG. 1 via a conveyance control unit 207. The print head 8 performs print operation in synchronization with the conveyance operation of the print medium S under instructions from the print controller 202, thereby performing printing.

A head carriage control unit 208 changes the orientation and position of the print head 8 in accordance with an operating state of the printing apparatus 1 such as a maintenance state or a printing state. An ink supply control unit 209 controls the ink supply unit 15 such that the pressure of ink supplied to the print head 8 is within a suitable range. A maintenance control unit 210 controls the operation of the cap unit 10 and wiping unit 17 in the maintenance unit 16 when performing maintenance operation for the print head 8.

In the scanner engine unit 300, the main controller 101 controls hardware resources of the scanner controller 302 using the RAM 106 as a work area in accordance with various parameters and programs stored in the ROM 107, thereby controlling various mechanisms of the scanner unit 3. For example, the main controller 101 controls hardware resources in the scanner controller 302 via a controller I/F 301 to cause a conveyance control unit 304 to convey a document placed by a user on the ADF and cause a sensor 305 to scan the document. The scanner controller 302 stores scanned image data in a RAM 303. The print controller 202 can convert the image data acquired as described above into print data to enable the print head 8 to perform print operation based on the image data scanned by the scanner controller 302.

Figure 3:
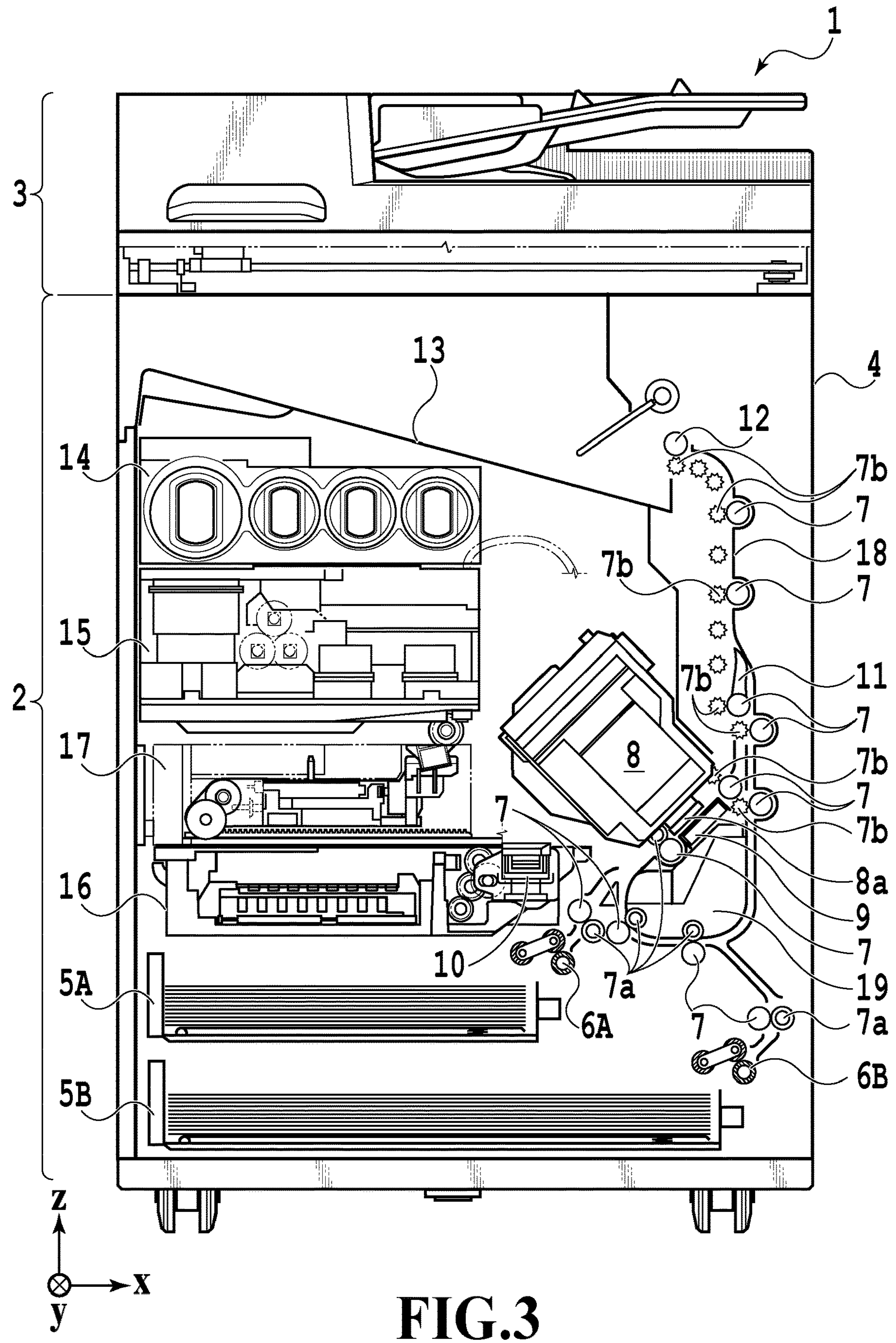
FIG. 3 is a diagram showing the printing apparatus in a printing state.

FIG. 3 shows the printing apparatus 1 in a printing state. As compared with the standby state shown in FIG. 1, the cap unit 10 is separated from the ejection opening surface 8*a* of the print head 8 and the ejection opening surface 8*a* faces the platen 9. In the present embodiment, the plane of the platen 9 is inclined about 45° with respect to the horizontal plane. The ejection opening surface 8*a* of the print head 8 in a printing position is also inclined about 45° with respect to the horizontal plane so as to keep a constant distance from the platen 9.

In the case of moving the print head 8 from the standby position shown in FIG. 1 to the printing position shown in FIG. 3, the print controller 202 uses the maintenance control unit 210 to move the cap unit 10 down to an evacuation position shown in FIG. 3, thereby separating the cap member 10*a* from the ejection opening surface 8*a* of the print head 8. The print controller 202 then uses the head carriage control unit 208 to turn the print head 8 45° while adjusting the vertical height of the print head 8 such that the ejection opening surface 8*a* faces the platen 9. After the completion of print operation, the print controller 202 reverses the above procedure to move the print head 8 from the printing position to the standby position.

Next, a conveying path of a print medium S in the print unit 2 will be described. When a print command is input, the print controller 202 first uses the maintenance control unit 210 and the head carriage control unit 208 to move the print head 8 to the printing position shown in FIG. 3. The print controller 202 then uses the conveyance control unit 207 to drive either the first feeding unit 6A or the second feeding unit 6B in accordance with the print command and feed a print medium S.

Figure 4A:
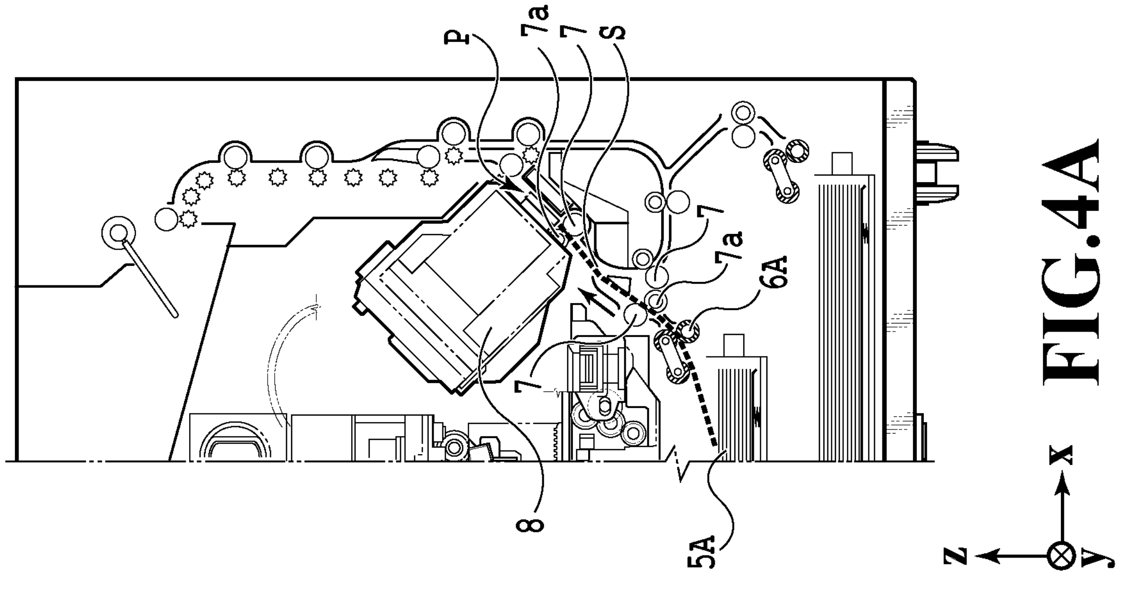
FIGS. 4A to 4C are conveying path diagrams of a print medium fed from a first cassette.
Figure 4B:
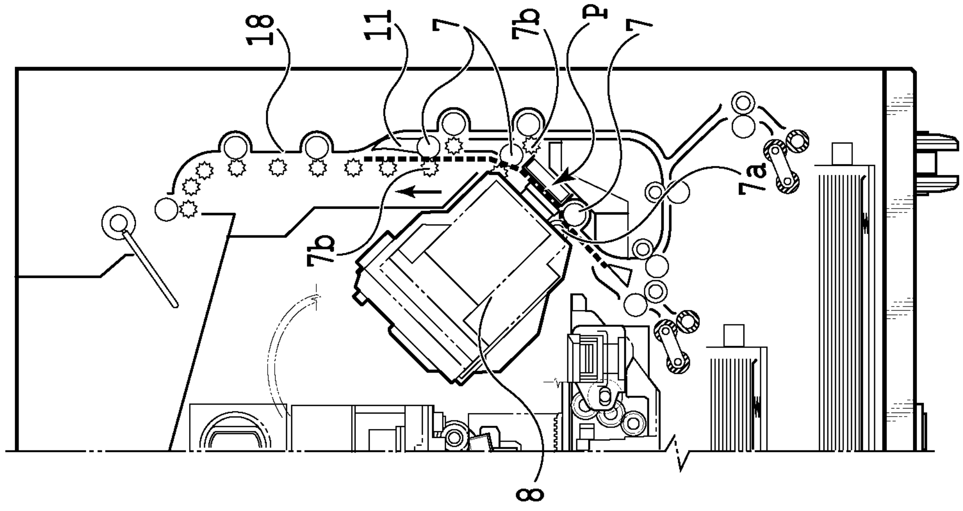
Figure 4C:
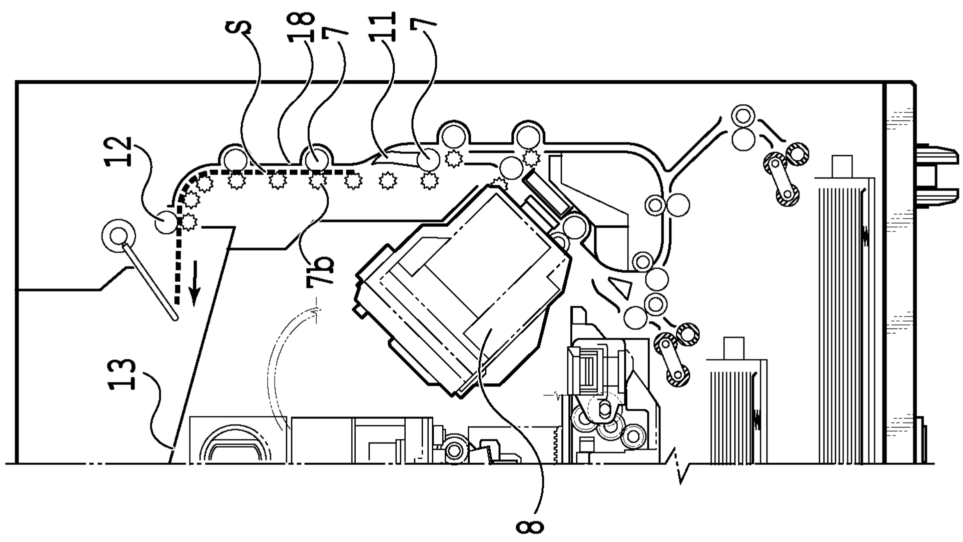

FIGS. 4A to 4C are diagrams showing a conveying path in the case of feeding an A4 size print medium S from the first cassette 5A. A print medium S at the top of a print medium stack in the first cassette 5A is separated from the rest of the stack by the first feeding unit 6A and conveyed toward a print area P between the platen 9 and the print head 8 while being nipped between the conveying rollers 7 and the pinch rollers 7*a*. FIG. 4A shows a conveying state where the front end of the print medium S is about to reach the print area P. The direction of movement of the print medium S is changed from the horizontal direction (x-direction) to a direction inclined about 45° with respect to the horizontal direction while being fed by the first feeding unit 6A to reach the print area P.

In the print area P, a plurality of ejection openings provided in the print head 8 eject ink toward the print medium S. In an area where ink is applied to the print medium S, the back side of the print medium S is supported by the platen 9 so as to keep a constant distance between the ejection opening surface 8*a* and the print medium S. After ink is applied to the print medium S, the conveying rollers 7 and the spurs 7*b* guide the print medium S such that the print medium S passes on the left of the flapper 11 with its tip inclined to the right and is conveyed along the guide 18 in the vertically upward direction of the printing apparatus 1. FIG. 4B shows a state where the front end of the print medium S has passed through the print area P and the print medium S is being conveyed vertically upward. The conveying rollers 7 and the spurs 7*b* change the direction of movement of the print medium S from the direction inclined about 45° with respect to the horizontal direction in the print area P to the vertically upward direction.

After being conveyed vertically upward, the print medium S is discharged into the discharging tray 13 by the discharging roller 12 and the spurs 7*b*. FIG. 4C shows a state where the front end of the print medium S has passed through the discharging roller 12 and the print medium S is being discharged into the discharging tray 13. The discharged print medium S is held in the discharging tray 13 with the side on which an image was printed by the print head 8 down.

Figure 5C:
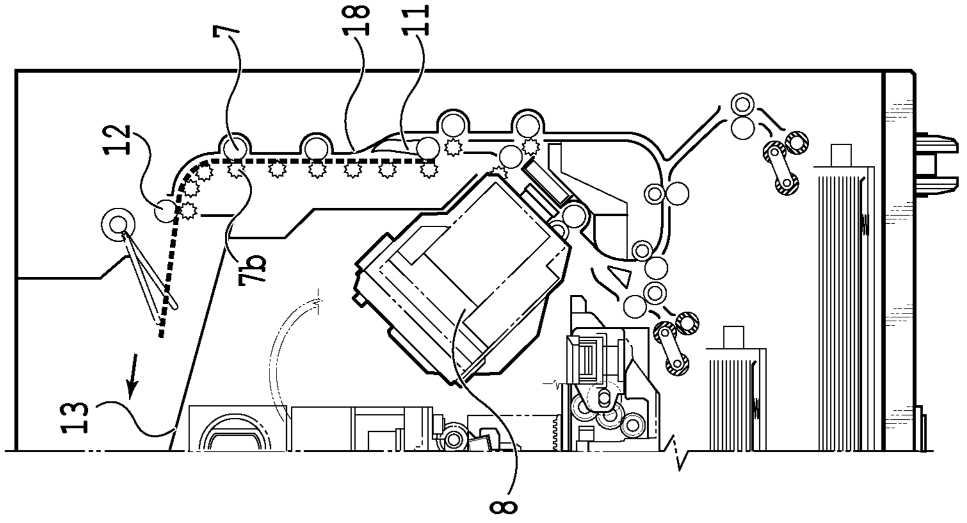
FIGS. 5A to 5C are conveying path diagrams of a print medium fed from a second cassette.
Figure 5B:
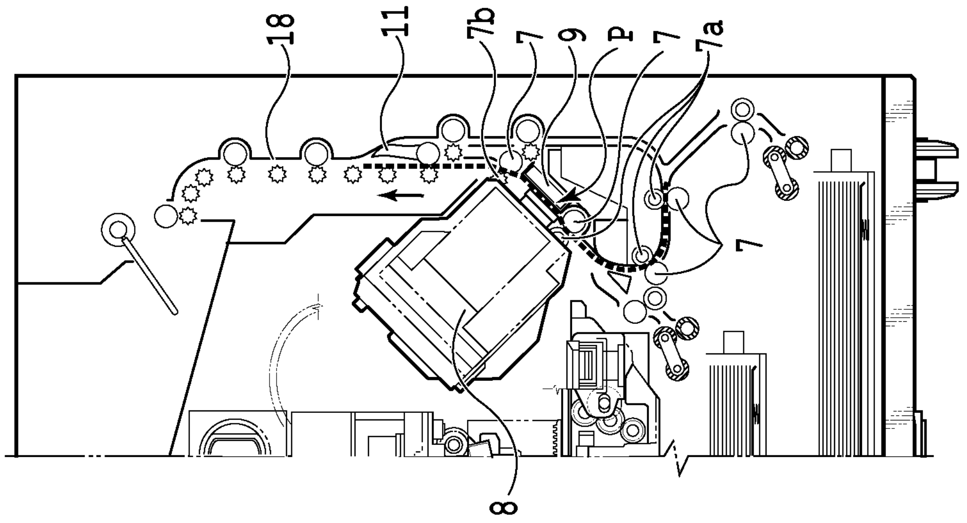
Figure 5A:
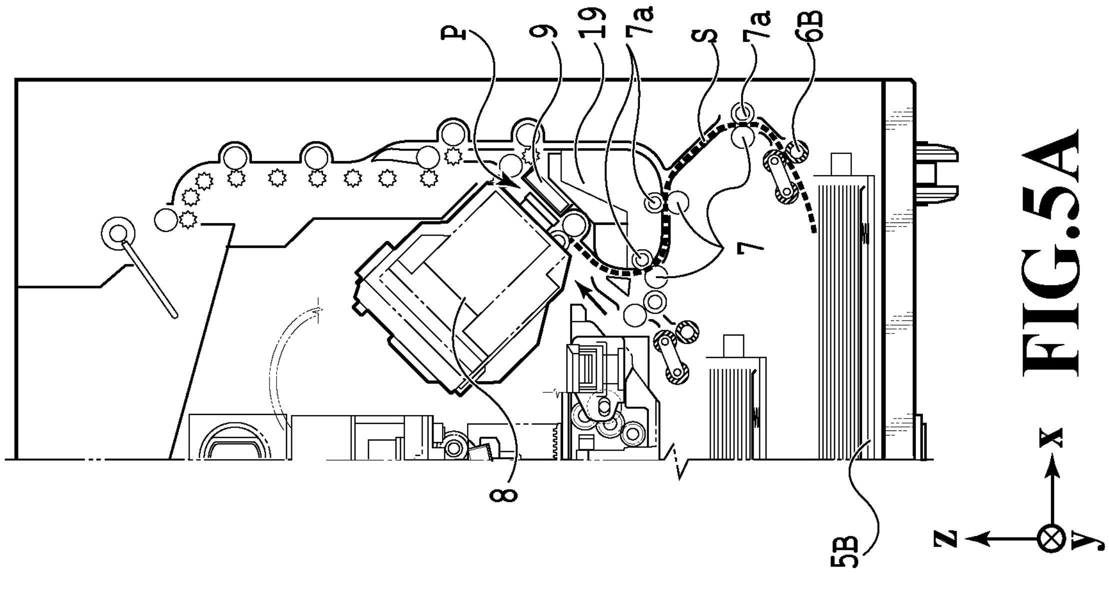

FIGS. 5A to 5C are diagrams showing a conveying path in the case of feeding an A3 size print medium S from the second cassette 5B. A print medium S at the top of a print medium stack in the second cassette 5B is separated from the rest of the stack by the second feeding unit 6B and conveyed toward the print area P between the platen 9 and the print head 8 while being nipped between the conveying rollers 7 and the pinch rollers 7*a*.

FIG. 5A shows a conveying state where the front end of the print medium S is about to reach the print area P. In a part of the conveying path, through which the print medium S is fed by the second feeding unit 6B toward the print area P, the plurality of conveying rollers 7, the plurality of pinch rollers 7*a*, and the inner guide 19 are provided such that the print medium S is conveyed to the platen 9 while being bent into an S-shape.

The rest of the conveying path is the same as that in the case of the A4 size print medium S shown in FIGS. 4B and 4C. FIG. 5B shows a state where the front end of the print medium S has passed through the print area P and the print medium S is being conveyed vertically upward. FIG. 5C shows a state where the front end of the print medium S has passed through the discharging roller 12 and the print medium S is being discharged into the discharging tray 13.

FIGS. 6A to 6D show a conveying path in the case of performing print operation (duplex printing) for the back side (second side) of an A4 size print medium S. In the case of duplex printing, print operation is first performed for the first side (front side) and then performed for the second side (back side). A conveying procedure during print operation for the first side is the same as that shown in FIGS. 4A to 4C and therefore description will be omitted. A conveying procedure subsequent to FIG. 4C will be described below.

Figure 6A:
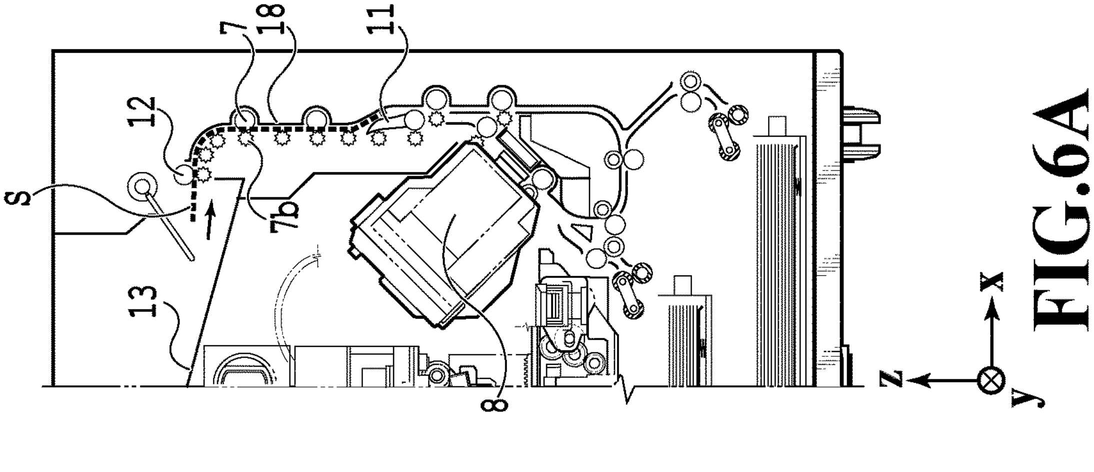
FIGS. 6A to 6D are conveying path diagrams in the case of performing print operation for the back side of a print medium.

After the print head 8 finishes print operation for the first side and the back end of the print medium S passes by the flapper 11, the print controller 202 turns the conveying rollers 7 reversely to convey the print medium S into the printing apparatus 1. At this time, since the flapper 11 is controlled by an actuator (not shown) such that the tip of the flapper 11 is inclined to the left, the front end of the print medium S (corresponding to the back end during the print operation for the first side) passes on the right of the flapper 11 and is conveyed vertically downward. FIG. 6A shows a state where the front end of the print medium S (corresponding to the back end during the print operation for the first side) is passing on the right of the flapper 11.

Figure 6B:
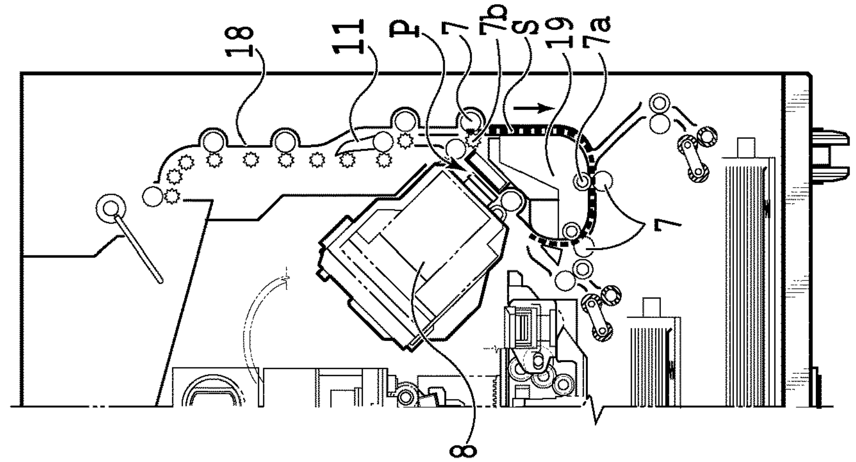

Then, the print medium S is conveyed along the curved outer surface of the inner guide 19 and then conveyed again to the print area P between the print head 8 and the platen 9. At this time, the second side of the print medium S faces the ejection opening surface 8*a* of the print head 8. FIG. 6B shows a conveying state where the front end of the print medium S is about to reach the print area P for print operation for the second side.

Figure 6C:
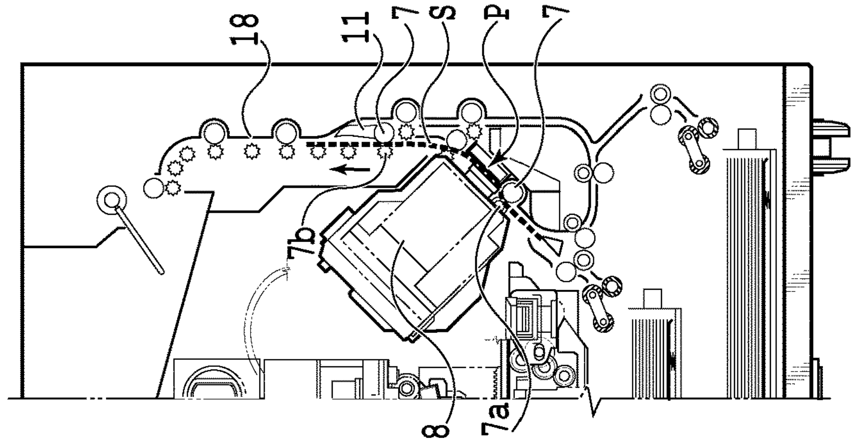
Figure 6D:
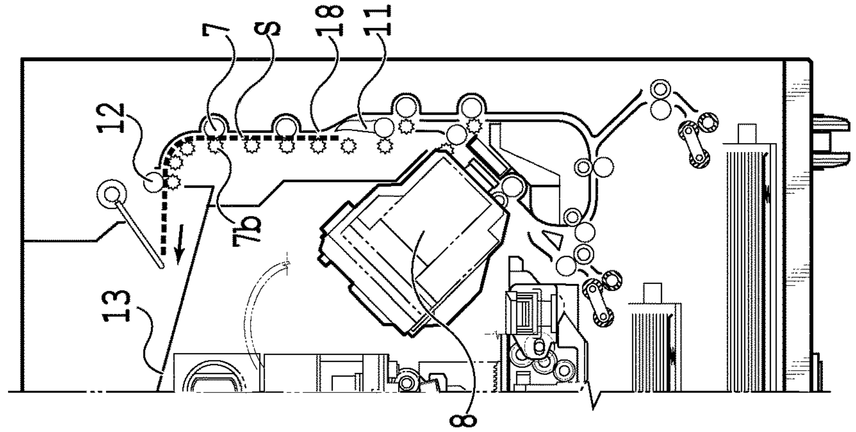

The rest of the conveying path is the same as that in the case of the print operation for the first side shown in FIGS. 4B and 4C. FIG. 6C shows a state where the front end of the print medium S has passed through the print area P and the print medium S is being conveyed vertically upward. At this time, the flapper 11 is controlled by the actuator (not shown) such that the tip of the flapper 11 is inclined to the right. FIG. 6D shows a state where the front end of the print medium S has passed through the discharging roller 12 and the print medium S is being discharged into the discharging tray 13.

Next, maintenance operation for the print head 8 will be described. As described with reference to FIG. 1, the maintenance unit 16 of the present embodiment comprises the cap unit 10 and the wiping unit 17 and activates them at predetermined timings to perform maintenance operation.

Figure 7:
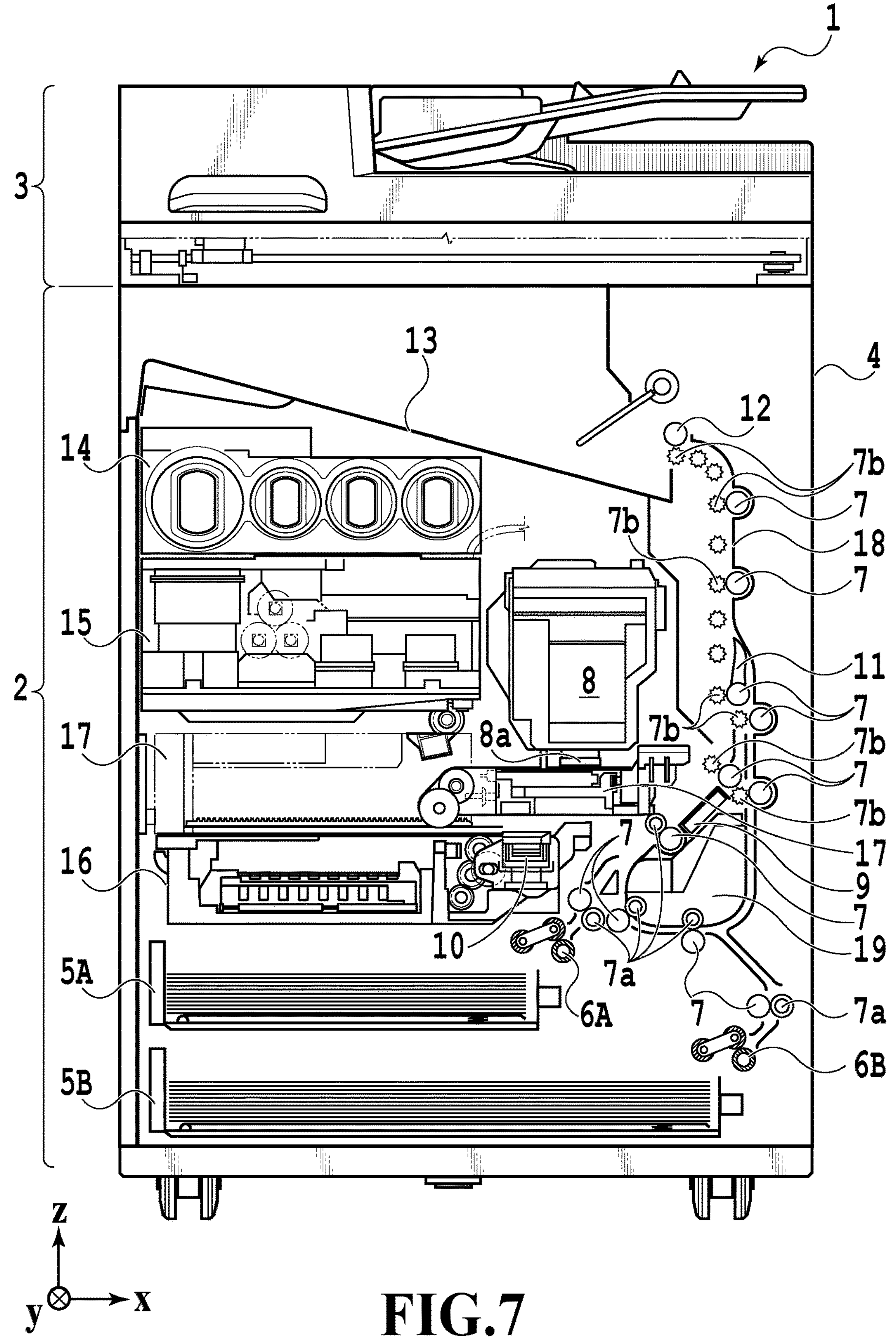
FIG. 7 is a diagram showing the printing apparatus in a maintenance state.

FIG. 7 is a diagram showing the printing apparatus 1 in a maintenance state. In the case of moving the print head 8 from the standby position shown in FIG. 1 to a maintenance position shown in FIG. 7, the print controller 202 moves the print head 8 vertically upward and moves the cap unit 10 vertically downward. The print controller 202 then moves the wiping unit 17 from the evacuation position to the right in FIG. 7. After that, the print controller 202 moves the print head 8 vertically downward to the maintenance position where maintenance operation can be performed.

On the other hand, in the case of moving the print head 8 from the printing position shown in FIG. 3 to the maintenance position shown in FIG. 7, the print controller 202 moves the print head 8 vertically upward while turning it 45°. The print controller 202 then moves the wiping unit 17 from the evacuation position to the right. Following that, the print controller 202 moves the print head 8 vertically downward to the maintenance position where maintenance operation can be performed by the maintenance unit 16.

Figure 8A:
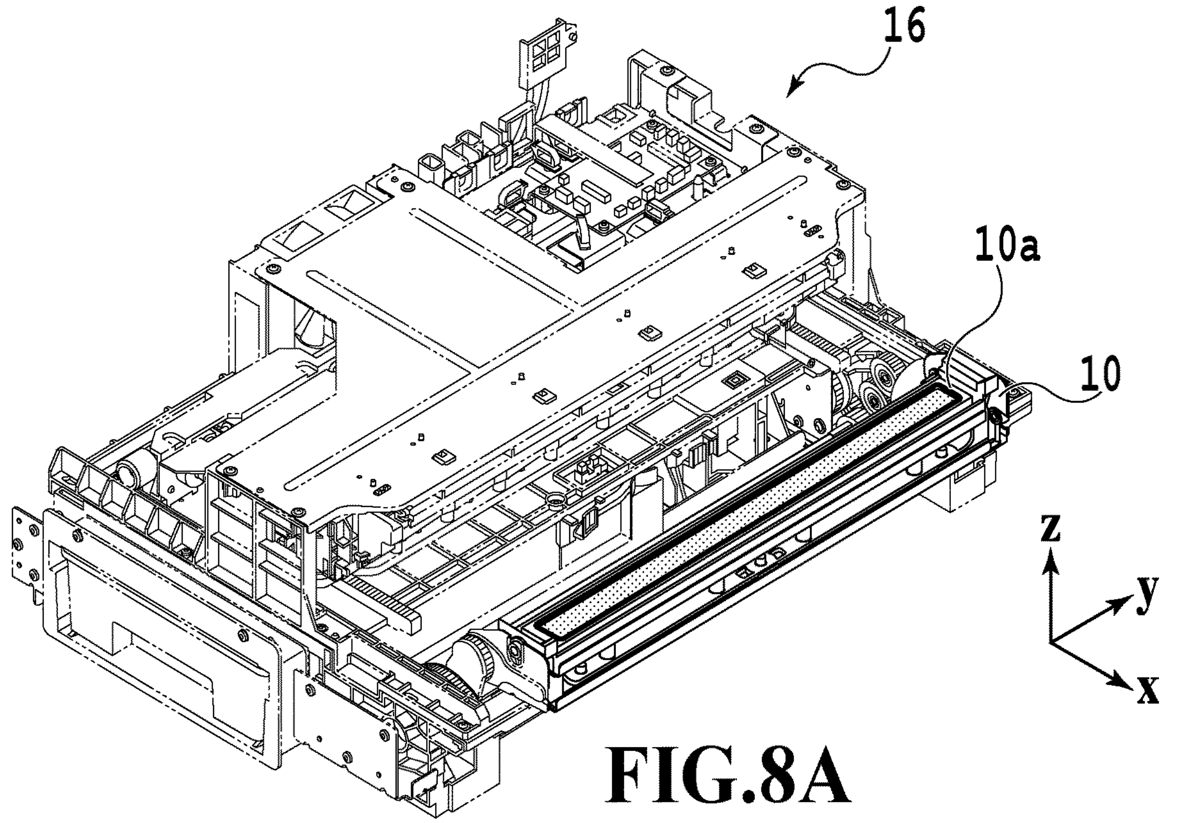
FIGS. 8A and 8B are perspective views showing the configuration of a maintenance unit.
Figure 8B:
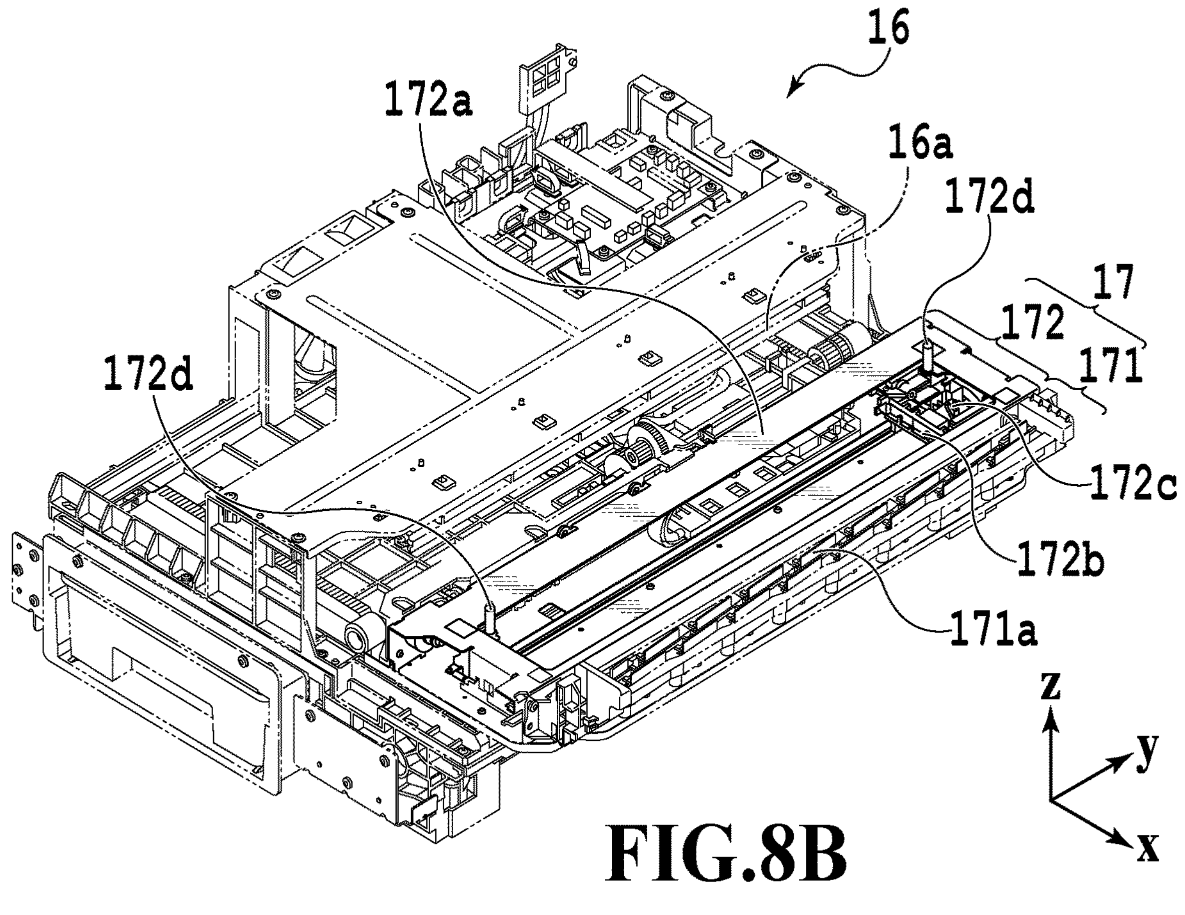

FIG. 8A is a perspective view showing the maintenance unit 16 in a standby position. FIG. 8B is a perspective view showing the maintenance unit 16 in a maintenance position. FIG. 8A corresponds to FIG. 1 and FIG. 8B corresponds to FIG. 7. When the print head 8 is in the standby position, the maintenance unit 16 is in the standby position shown in FIG. 8A, the cap unit 10 has been moved vertically upward, and the wiping unit 17 is housed in the maintenance unit 16. The cap unit 10 comprises a box-shaped cap member 10*a* extending in the y-direction. The cap member 10*a* can be brought into intimate contact with the ejection opening surface 8*a* of the print head 8 to prevent ink from evaporating from the ejection openings. The cap unit 10 also has the function of collecting ink ejected to the cap member 10*a* for preliminary ejection or the like and allowing a suction pump (not shown) to suck the collected ink.

On the other hand, in the maintenance position shown in FIG. 8B, the cap unit 10 has been moved vertically downward and the wiping unit 17 has been drawn from the maintenance unit 16. The wiping unit 17 comprises two wiper units: a blade wiper unit 171 and a vacuum wiper unit 172.

In the blade wiper unit 171, blade wipers 171*a* for wiping the ejection opening surface 8*a* in the x-direction are provided in the y-direction by the length of an area where the ejection openings are arrayed. In the case of performing wiping operation by the use of the blade wiper unit 171, the wiping unit 17 moves the blade wiper unit 171 in the x-direction while the print head 8 is positioned at a height at which the print head 8 can be in contact with the blade wipers 171*a*. This movement enables the blade wipers 171*a* to wipe ink and the like adhering to the ejection opening surface 8*a*.

The entrance of the maintenance unit 16 through which the blade wipers 171*a* are housed is equipped with a wet wiper cleaner 16*a* for removing ink adhering to the blade wipers 171*a* and applying a wetting liquid to the blade wipers 171*a*. The wet wiper cleaner 16*a* removes substances adhering to the blade wipers 171*a* and applies the wetting liquid to the blade wipers 171*a* each time the blade wipers 171*a* are inserted into the maintenance unit 16. The wetting liquid is transferred to the ejection opening surface 8*a* in the next wiping operation for the ejection opening surface 8*a*, thereby facilitating sliding between the ejection opening surface 8*a* and the blade wipers 171*a*.

The vacuum wiper unit 172 comprises a flat plate 172*a* having an opening extending in the y-direction, a carriage 172*b* movable in the y-direction within the opening, and a vacuum wiper 172*c* mounted on the carriage 172*b*. The vacuum wiper 172*c* is provided to wipe the ejection opening surface 8*a* in the y-direction along with the movement of the carriage 172*b*. The tip of the vacuum wiper 172*c* has a suction opening connected to the suction pump (not shown). Accordingly, if the carriage 172*b* is moved in the y-direction while operating the suction pump, ink and the like adhering to the ejection opening surface 8*a* of the print head 8 are wiped and gathered by the vacuum wiper 172*c* and sucked into the suction opening. At this time, the flat plate 172*a* and a dowel pin 172*d* provided at both ends of the opening are used to align the ejection opening surface 8*a* with the vacuum wiper 172*c*.

In the present embodiment, it is possible to carry out a first wiping process in which the blade wiper unit 171 performs wiping operation and the vacuum wiper unit 172 does not perform wiping operation and a second wiping process in which both the wiper units sequentially perform wiping operation. In the case of the first wiping process, the print controller 202 first draws the wiping unit 17 from the maintenance unit 16 while the print head 8 is evacuated vertically above the maintenance position shown in FIG. 7. The print controller 202 moves the print head 8 vertically downward to a position where the print head 8 can be in contact with the blade wipers 171*a* and then moves the wiping unit 17 into the maintenance unit 16. This movement enables the blade wipers 171*a* to wipe ink and the like adhering to the ejection opening surface 8*a*. That is, the blade wipers 171*a* wipe the ejection opening surface 8*a* when moving from a position drawn from the maintenance unit 16 into the maintenance unit 16.

After the blade wiper unit 171 is housed, the print controller 202 moves the cap unit 10 vertically upward and brings the cap member 10*a* into intimate contact with the ejection opening surface 8*a* of the print head 8. In this state, the print controller 202 drives the print head 8 to perform preliminary ejection and allows the suction pump to suck ink collected in the cap member 10*a*.

In the case of the second wiping process, the print controller 202 first slides the wiping unit 17 to draw it from the maintenance unit 16 while the print head 8 is evacuated vertically above the maintenance position shown in FIG. 7. The print controller 202 moves the print head 8 vertically downward to the position where the print head 8 can be in contact with the blade wipers 171*a* and then moves the wiping unit 17 into the maintenance unit 16. This movement enables the blade wipers 171*a* to perform wiping operation for the ejection opening surface 8*a*. Next, the print controller 202 slides the wiping unit 17 to draw it from the maintenance unit 16 to a predetermined position while the print head 8 is evacuated again vertically above the maintenance position shown in FIG. 7. Then, the print controller 202 uses the flat plate 172*a* and the dowel pins 172*d* to align the ejection opening surface 8*a* with the vacuum wiper unit 172 while moving the print head 8 down to a wiping position shown in FIG. 7. After that, the print controller 202 allows the vacuum wiper unit 172 to perform the wiping operation described above. After evacuating the print head 8 vertically upward and housing the wiping unit 17, the print controller 202 allows the cap unit 10 to perform preliminary ejection into the cap member and suction operation of collected ink in the same manner as the first wiping process.

Figure 9:
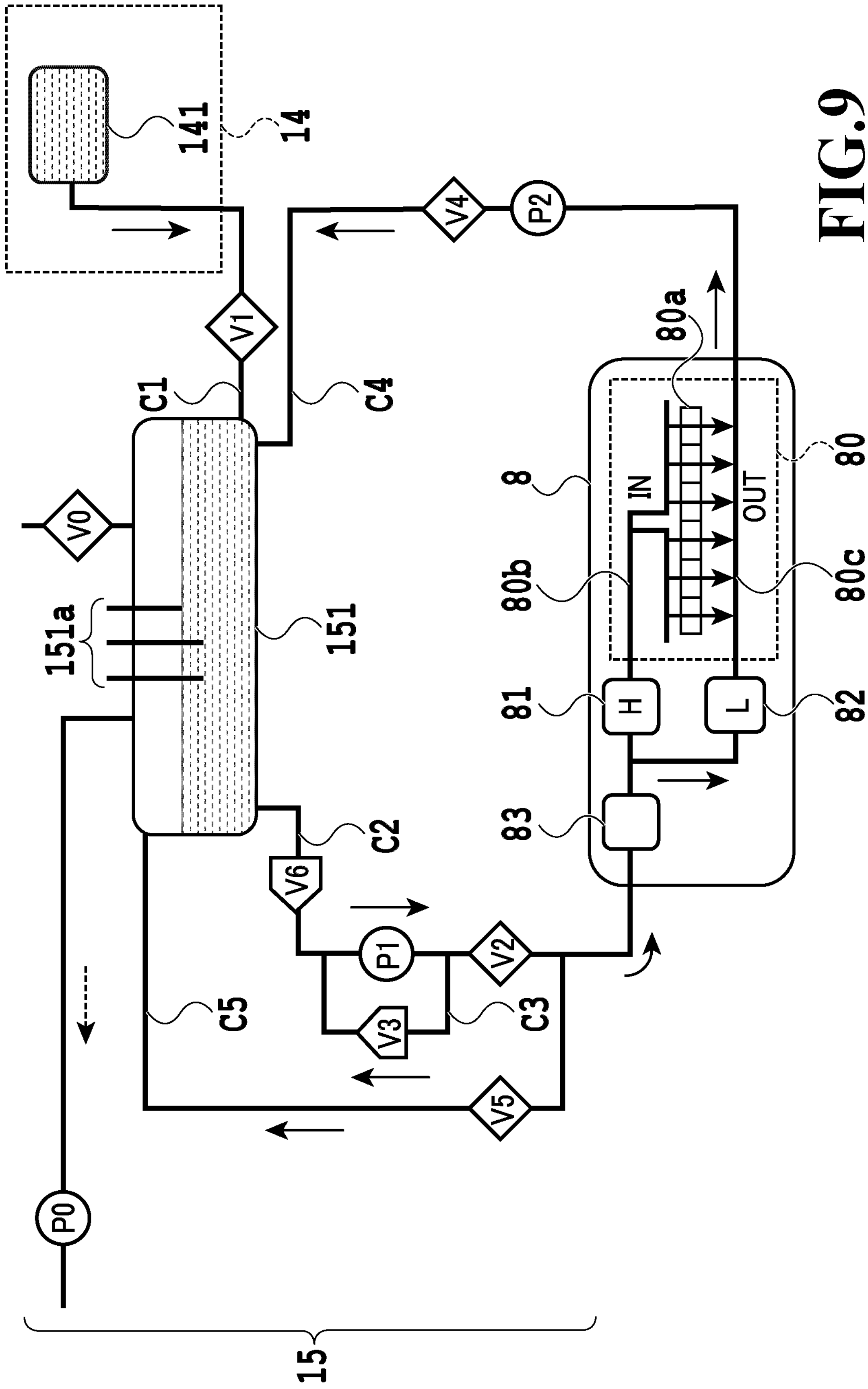
FIG. 9 is a diagram showing a flow path configuration of an ink circulation system.

FIG. 9 is a diagram including the ink supply unit 15 adopted in the inkjet printing apparatus 1 of the present embodiment. A flow path configuration of an ink circulation system of the present embodiment will be described with reference to FIG. 9. The ink supply unit 15 is configured to supply ink from the ink tank unit 14 to the print head 8. Although the drawing shows a configuration for one ink color, such a configuration is actually prepared for each ink color. The ink supply unit 15 is basically controlled by the ink supply control unit 209 shown in FIG. 2. Each configuration of the unit will be described below.

Ink is mainly circulated between a sub-tank 151 and the print head 8 (head unit in FIG. 9). In the head unit 8, ink ejection operation is performed based on image data and ink not ejected is collected to the sub-tank 151.

The sub-tank 151 storing a predetermined amount of ink is connected to a supply flow path C2 for supplying ink to the head unit 8 and a collection flow path C4 for collecting ink from the head unit 8. That is, the sub-tank 151, the supply flow path C2, the head unit 8, and the collection flow path C4 form a circulation path through which ink is circulated.

The sub-tank 151 is equipped with a liquid level detection unit 151*a* including a plurality of pins. The ink supply control unit 209 can grasp an ink liquid level, namely the amount of ink remaining in the sub-tank 151 by detecting the presence or absence of continuity between the pins. A decompression pump P0 is a negative pressure source for decompressing the inside of the sub-tank 151. An air release valve V0 is a valve for switching communication and non-communication between the inside of the sub-tank 151 and the air.

A main tank 141 is a tank that stores ink to be supplied to the sub-tank 151. The main tank 141 is made from a flexible material. A change in the volume of the flexible material allows the sub-tank 151 to be filled with ink. The main tank 141 can be attached to and detached from the body of the printing apparatus. In the midstream of a tank connection flow path C1 connecting the sub-tank 151 to the main tank 141, a tank supply valve V1 is provided to switch the connection between the sub-tank 151 and the main tank 141.

With the above configuration, if the liquid level detection unit 151*a* detects that the amount of ink in the sub-tank 151 becomes less than a predetermined amount, the ink supply control unit 209 closes the air release valve V0, a supply valve V2, a collection valve V4, and a head replacement valve V5 and opens the tank supply valve V1. In this state, the ink supply control unit 209 activates the decompression pump P0, whereby the inside of the sub-tank 151 has a negative pressure and ink is supplied from the main tank 141 to the sub-tank 151. If the liquid level detection unit 151*a* detects that the amount of ink in the sub-tank 151 exceeds a predetermined amount, the ink supply control unit 209 closes the tank supply valve V1 and deactivates the decompression pump P0.

The supply flow path C2 is a flow path for supplying ink from the sub-tank 151 to the head unit 8. A supply pump P1 and the supply valve V2 are provided in the midstream of the supply flow path C2. During print operation, the supply pump P1 is driven with the supply valve V2 opened, thereby circulating ink through the circulation path while supplying ink to the head unit 8. The amount of ink ejected by the head unit 8 per unit time varies according to image data. The amount of flow through the supply pump P1 is determined so as to cope with a case where the head unit 8 performs ejection operation to consume a maximum amount of ink per unit time.

A relief flow path C3 is a flow path located upstream of the supply valve V2 and connecting the upstream side and downstream side of the supply pump P1. A section connected to the upstream side of the supply pump P1 is referred to as a first connection section and a section connected to the downstream side is referred to as a second connection section. A relief valve V3, which is a differential pressure valve, is provided in the midstream of the relief flow path C3. In a case where the amount of ink supplied from the supply pump P1 per unit time is greater than the sum total of the amount of ejection from the head unit 8 per unit time and the amount of flow (the amount of ink to be drawn) through the collection pump P2 per unit time, the relief valve V3 is opened depending on a pressure applied thereon. This forms a circulation flow path that consists of the relief flow path C3 and part of the supply flow path C2. Providing the relief flow path C3 makes it possible to adjust the amount of ink supplied to the head unit 8 depending on the amount of ink consumed in the head unit 8 and stabilize a fluid pressure in the circulation path irrespective of image data.

A backflow prevention valve (a check valve) V6 comprising a sealing member or the like is provided upstream of a section where the relief flow path C3 is connected to the supply flow path C2 upstream of the supply pump P1. In a case where ink tries to flow back from the supply flow path C2 to the sub-tank 151, the backflow prevention valve V6 is automatically closed to prevent backflow of ink to the sub-tank 151. That is, the backflow prevention valve V6 prevents ink from being drawn back from the supply flow path C2 to the sub-tank 151 by decompressing the sub-tank 151.

The backflow prevention valve V6 is opened and closed depending on a pressure difference between the upstream and downstream sides of the valve. More specifically, on the assumption that a pressure on the sub-tank 151 side is $P_{151}$ and a pressure upstream of the supply pump P1 is $P_1$, the backflow prevention valve V6 is opened if $P_{151}-P_1 \geq C$. The predetermined value C is a threshold of the pressure difference and is a value unique to the backflow prevention valve V6. That is, the backflow prevention valve V6 regulates an ink flow in a direction in which ink is supplied from the sub-tank 151 to the supply pump P1. On the other hand, the backflow prevention valve V6 is closed if $P_{151}-P_1 < C$.

The collection flow path C4 is a flow path for collecting ink from the head unit 8 to the sub-tank 151. A collection pump P2 and the collection valve V4 are provided in the midstream of the collection flow path C4. In the case of circulating ink through the circulation path, the collection pump P2 serves as a negative pressure source to suck ink from the head unit 8. Driving the collection pump P2 produces a suitable pressure difference between an inflow path 80*b* and an outflow path 80*c* in the head unit 8 and enables ink to flow from the inflow path 80*b* to the outflow path 80*c*. A flow path configuration in the head unit 8 will be described later in detail.

The collection valve V4 is a valve for preventing backflow in a case where no printing operation is performed, that is, ink is not circulated through the circulation path. In the circulation path of the present embodiment, the sub-tank 151 is located vertically above the head unit 8 (see FIG. 1). Accordingly, in a case where neither the supply pump P1 nor the collection pump P2 is driven, a difference in pressure head between the sub-tank 151 and the head unit 8 may cause backflow of ink from the sub-tank 151 to the head unit 8. In order to prevent such backflow, the collection valve V4 is provided in the collection flow path C4 in the present embodiment.

Similarly, in a case where no printing operation is performed, that is, ink is not circulated through the circulation path, the supply valve V2 also functions as a valve for preventing ink from being supplied from the sub-tank 151 to the head unit 8.

A head replacement flow path C5 is a flow path connecting the supply flow path C2 to an air chamber (space not storing ink) of the sub-tank 151. The head replacement valve V5 is provided in the midstream of the head replacement flow path C5. One end of the head replacement flow path C5 is connected to the supply flow path C2 upstream of the head unit 8 and is referred to as a third connection section. The third connection section is located downstream of the supply valve V2. The other end of the head replacement flow path C5 is connected to the upper part of the sub-tank 151 to communicate with the inner air chamber and is referred to as a fourth connection section. The head replacement flow path C5 is used for collecting ink from the head unit 8 in use, for example, in the case of replacing the head unit 8 or transporting the printing apparatus 1. The head replacement valve V5 is controlled by the ink supply control unit 209 so as to be closed except for the case of filling the printing apparatus 1 with ink or collecting ink from the head unit 8. The supply valve V2 described above is provided in the supply flow path C2 between the third connection section to the head replacement flow path C5 and the second connection section to the relief flow path C3. The second connection section may be located downstream of the third connection section in the supply flow path C2.

Next, the flow path configuration in the head unit 8 will be described. Ink supplied from the supply flow path C2 to the head unit 8 passes through a filter 83 and is then supplied to a first negative pressure control unit 81 and a second negative pressure control unit 82. The first negative pressure control unit 81 is controlled to have a low negative pressure. The second negative pressure control unit 82 is controlled to have a high negative pressure. These pressures in the first negative pressure control unit 81 and the second negative pressure control unit 82 are created within a suitable range by driving the collection pump P2.

An ink ejection unit 80 has a plurality of printing element substrates 80*a*, in each of which a plurality of ejection openings are arrayed, to form an elongated ejection opening array. A common supply flow path 80*b* (inflow path) for guiding ink supplied from the first negative pressure control unit 81 and a common collection flow path 80*c* (outflow path) for guiding ink supplied from the second negative pressure control unit 82 extend in a direction in which the printing element substrates 80*a* are arrayed. Each printing element substrate 80*a* has an individual supply flow path connected to the common supply flow path 80*b* and an individual collection flow path connected to the common collection flow path 80*c*. Accordingly, an ink flow is produced in each printing element substrate 80*a* such that ink flows from the common supply flow path 80*b* having a relatively low negative pressure to the common collection flow path 80*c* having a relatively high negative pressure. Pressure chambers communicating with ejection openings respectively and filled with ink are provided in a path connecting the individual supply flow path to the individual collection flow path. An ink flow also occurs in pressure chambers and ejection openings that do not perform printing. In a case where ejection operation is performed in the printing element substrates 80*a*, ink flowing from the common supply flow path 80*b* to the common collection flow path 80*c* is partly ejected from the ejection openings and consumed, whereas ink not ejected flows to the collection flow path C4 through the common collection flow path 80*c*.

With the above configuration, in printing operation, the ink supply control unit 209 closes the tank supply valve V1 and the head replacement valve V5, opens the air release valve V0, the supply valve V2, and the collection valve V4, and drives the supply pump P1 and the collection pump P2. This establishes a circulation path through which ink flows in the order of the sub-tank 151, the supply flow path C2, the head unit 8, the collection flow path C4, and the sub-tank 151. In a case where the amount of ink supplied from the supply pump P1 per unit time is greater than the sum total of the amount of ejection from the head unit 8 per unit time and the amount of flow through the collection pump P2 per unit time, ink flows from the supply flow path C2 into the relief flow path C3, thereby adjusting the amount of ink flow from the supply flow path C2 to the head unit 8.

In a case where no printing operation is performed, the ink supply control unit 209 deactivates the supply pump P1 and the collection pump P2 and closes the air release valve V0, the supply valve V2, and the collection valve V4 to stop the ink flow in the head unit 8 and prevent backflow caused by difference in pressure head between the sub-tank 151 and the head unit 8. Further, closing the air release valve V0 prevents ink from leaking or evaporating from the sub-tank 151.

In the case of collecting ink from the head unit 8, the ink supply control unit 209 closes the tank supply valve V1, the supply valve V2, and the collection valve V4, opens the air release valve V0 and the head replacement valve V5, and drives the decompression pump P0, whereby the inside of the sub-tank 151 has a negative pressure and ink is collected from the head unit 8 to the sub-tank 151 through the head replacement flow path C5. As described above, the head replacement valve V5 is a valve that is closed during normal printing operation or standby and is opened in the case of collecting ink from the head unit 8. However, the head replacement valve V5 is opened also in the case of filling the head replacement flow path C5 with ink in a filling process of the head unit 8.

Ink Filling Process

Next, an ink filling process in the ink circulation system described with reference to FIG. 9 will be described. It should be noted that the illustration of the backflow prevention valve V6 is omitted from FIG. 10 onward. The ink filling process is performed for filling ink into the sub-tank 151, the print head 8, and flow paths through which ink is to be circulated, for example, after the main tank 141 is attached to the ink tank unit 14. The ink filling process is not limited to the arrival of the printing apparatus 1 but may be performed after the print head 8 is replaced or ink is totally collected to the sub-tank 151 for transportation. In the following description, filling operation performed on arrival of the printing apparatus 1 is referred to as initial filling operation and filling operation performed after ink is entirely collected to the sub-tank 151 is referred to as refilling operation.

Before the ink filling operation, an unsticking process for unsticking the backflow prevention valve V6 (FIG. 9) is performed in the present embodiment. The backflow prevention valve V6 is configured to be opened only at the occurrence of a pressure difference. Accordingly, if the backflow prevention valve V6 remains closed for a long period, the sealing member sticks to a wall surface inside the backflow prevention valve V6, which may interfere with the opening of the backflow prevention valve V6 even at the occurrence of a pressure difference. In other words, the sticking of the sealing member of the backflow prevention valve V6 may prevent the backflow prevention valve V6 from being opened even if $P_{151}-P_1 \geq C$. In order to avoid such an operation failure of the backflow prevention valve V6 due to sticking of the sealing member, the unsticking process for unsticking the sealing member from the wall surface is performed before the start of the ink filling operation. The unsticking process makes it possible to unstick the sealing member of the backflow prevention valve V6 and make the backflow prevention valve V6 suitably openable and closable.

Figure 22:
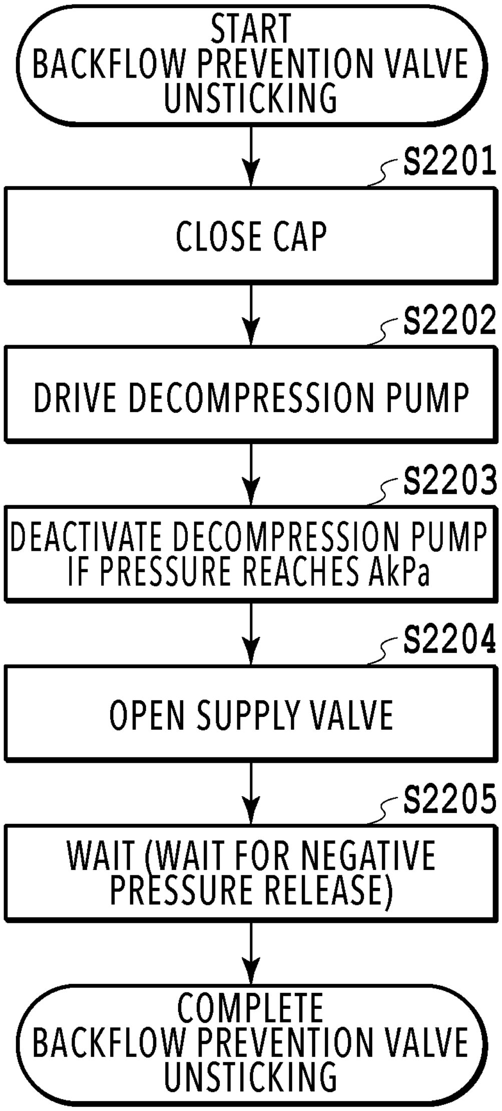
FIG. 22 is a flowchart of a backflow prevention valve unsticking process.

FIG. 22 is a flowchart of the unsticking process. The unsticking process is started from a state where the tank supply valve V1, the supply valve V2, the collection valve V4, and the head replacement valve V5 are closed, the air release valve V0 is opened, and the supply pump P1, the collection pump P2, and the decompression pumps P0 and P3 are inactive. First, in step S2201, the maintenance control unit 210 covers the ejection opening surface 8*a* with the cap unit 10. In step S2202, the ink supply control unit 209 drives the decompression pump P3 of the cap unit 10.

Driving the decompression pump P3 decompresses the inside of the cap unit 10, the head unit 8, a portion of the supply flow path C2 downstream of the supply valve V2, and a portion of the head replacement flow path C5 downstream of the head replacement valve V5. In step S2203, if it is detected that the pressure is reduced to be less than a predetermined pressure value AkPa, the ink supply control unit 209 deactivates the decompression pump P3. In the present embodiment, the pressure value is detected by an unshown pressure sensor connected to the cap unit 10.

In step S2204, the ink supply control unit 209 opens the supply valve V2. Opening the supply valve V2 produces a pressure difference having a predetermined pressure value A (A>>C) between the upstream and downstream sides of the backflow prevention valve V6, thereby opening the backflow prevention valve V6. Since the predetermined pressure value A is sufficiently greater than the predetermined value C, the sealing member of the backflow prevention valve V6 can be unstuck from the wall surface. In step S2205, the ink supply control unit 209 waits for a predetermined time until the negative pressure becomes equal to atmospheric pressure and then proceeds to the ink filling process shown in FIG. 10 onward. The unsticking process described above is not necessary in the refilling operation because it is performed in a case where ink has never been supplied to the backflow prevention valve V6.

Figure 10:
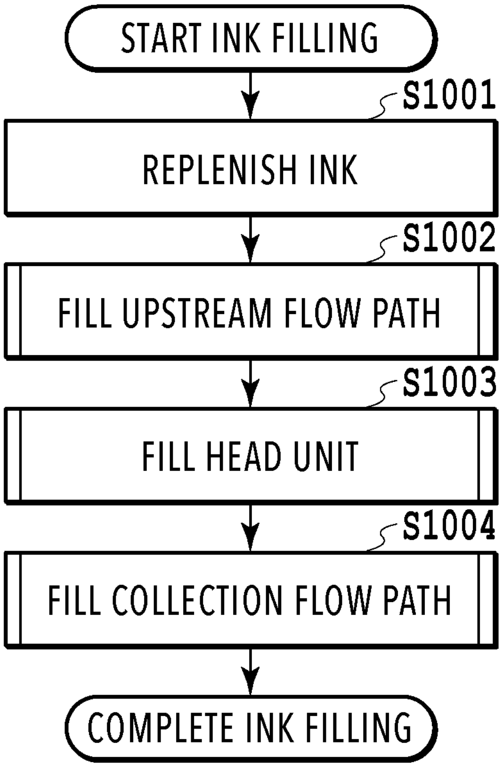
FIG. 10 is a flowchart of an ink filling process of the entire ink circulation system.

FIG. 10 is a flowchart of an ink filling process of the entire ink circulation system. The ink filling process is performed by the ink supply control unit 209 controlling the operation of various pumps and valves provided in the ink supply unit 15.

First, in step S1001, the ink supply control unit 209 replenishes the sub-tank 151 with ink from the main tank 141.

Figure 11:
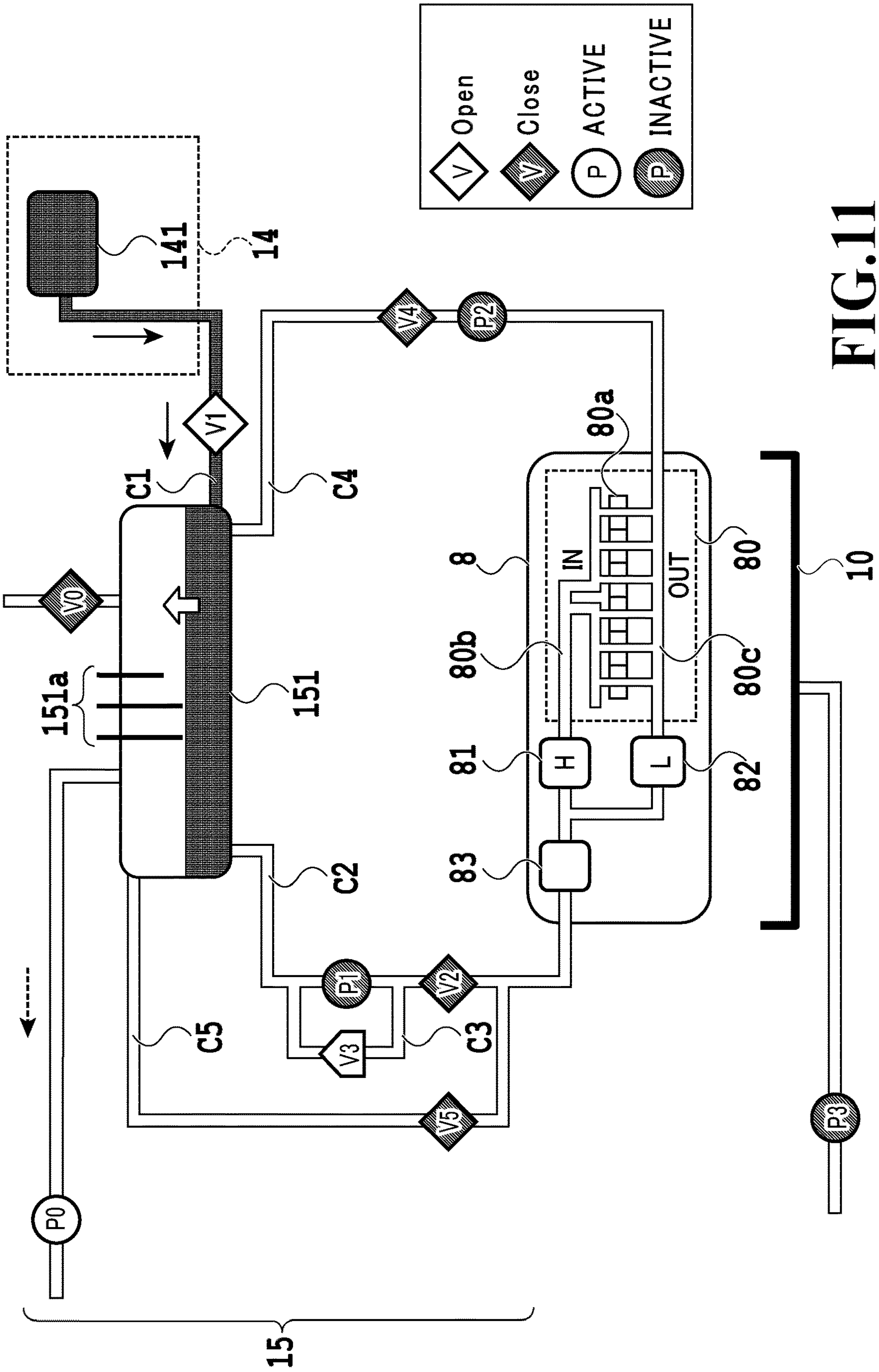
FIG. 11 is a diagram showing a state of the ink circulation system in the case of replenishing a sub-tank with ink from a main tank.

FIG. 11 shows a state of the ink circulation system in the case of replenishing the sub-tank 151 with ink from the main tank 141. In this state, the air release valve V0, the supply valve V2, the head replacement valve V5, and the collection valve V4 are closed and the tank supply valve V1 is opened. The supply pump P1 and the collection pump P2 are inactive. In a case where the decompression pump P0 is driven in this state, a negative pressure is created inside the sub-tank 151 and the sub-tank 151 is replenished with ink from the main tank 141 through the tank connection flow path C1. If the liquid level detection unit 151*a* in the sub-tank 151 detects that the amount of ink in the sub-tank 151 exceeds a predetermined amount, the ink supply control unit 209 closes the tank supply valve V1 and deactivates the decompression pump P0. The ink supply control unit 209 then opens the air release valve V0 to release the negative pressure from the sub-tank 151 to the air.

Next, in step S1002, the ink supply control unit 209 supplies ink from the sub-tank 151 to fill an upstream flow path with ink. The upstream flow path is a collective name of flow paths between the sub-tank 151 and the head unit 8 including the supply flow path C2, the relief flow path C3, and the head replacement flow path C5.

Figure 12:
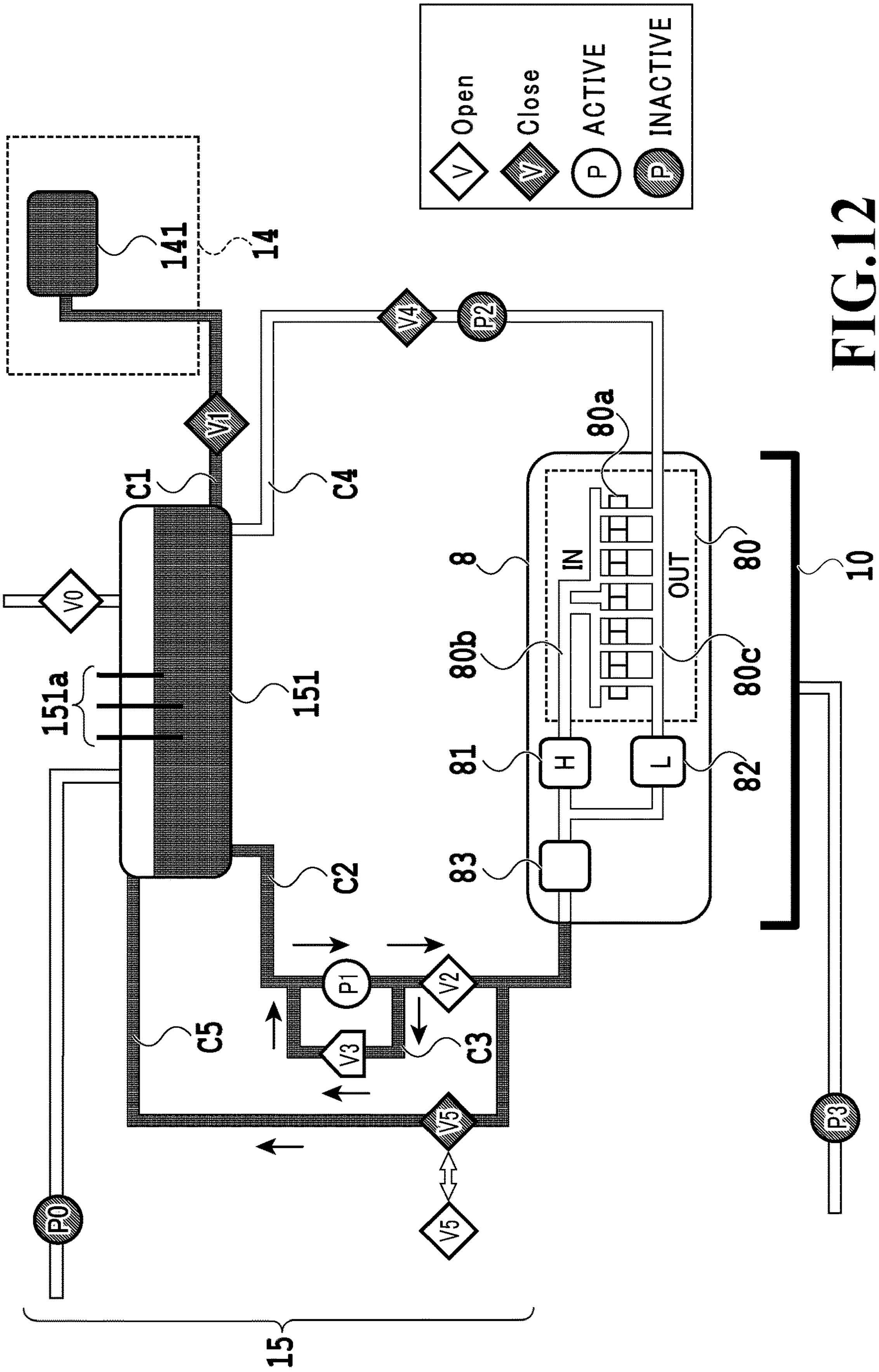
FIG. 12 is a diagram showing a state of the ink circulation system in the case of filling an upstream flow path with ink.

FIG. 12 shows a state of the ink circulation system in the case of filling the upstream flow path with ink. The supply valve V2 and the head replacement valve V5 are opened after the completion of ink replenishment to the sub-tank 151. It should be noted that the relief valve V3 is a differential pressure valve that is opened depending on a pressure applied thereon. In a case where the supply pump P1 is driven in this state, ink is supplied from the sub-tank 151 to fill the upstream flow path with ink. The collection pump P2 is inactive and the first and second negative pressure control units 81 and 82 are closed because a predetermined negative pressure is not applied thereto. Accordingly, ink is not supplied to the head unit 8.

Relief Flow Path Filling Process

In the ink filling process of the upstream flow path, an ink filling process of the relief flow path C3 will be described below in particular. The relief flow path C3 is a branch flow path (first branch flow path) connecting the sides of the supply flow path C2 upstream and downstream of the supply pump P1. The relief flow path C3 cannot sufficiently be filled with ink only by supplying ink from the supply pump P1 and there is a possibility that air bubbles remain inside the flow path. If air bubbles remain inside the relief flow path C3, the air bubbles may flow into the head unit 8 to cause a problem such as an ejection failure in the ejection openings.

In view of the above, in the present embodiment, the head replacement flow path C5 and the head replacement valve V5 are used to fill the relief flow path C3 with ink. This can reduce air bubbles remaining inside the relief flow path C3. The head replacement flow path C5 is a branch flow path (second branch flow path) connecting the sub-tank 151 to a section downstream of the connection section where the relief flow path C3 (first branch flow path) is connected to the supply flow path C2 downstream of the supply pump P1. The head replacement valve V5 is provided in the head replacement flow path C5 and serves as an open/close valve capable of opening and closing the head replacement flow path C5. The ink filling process of the relief flow path C3 will be described below in detail.

Figure 13:
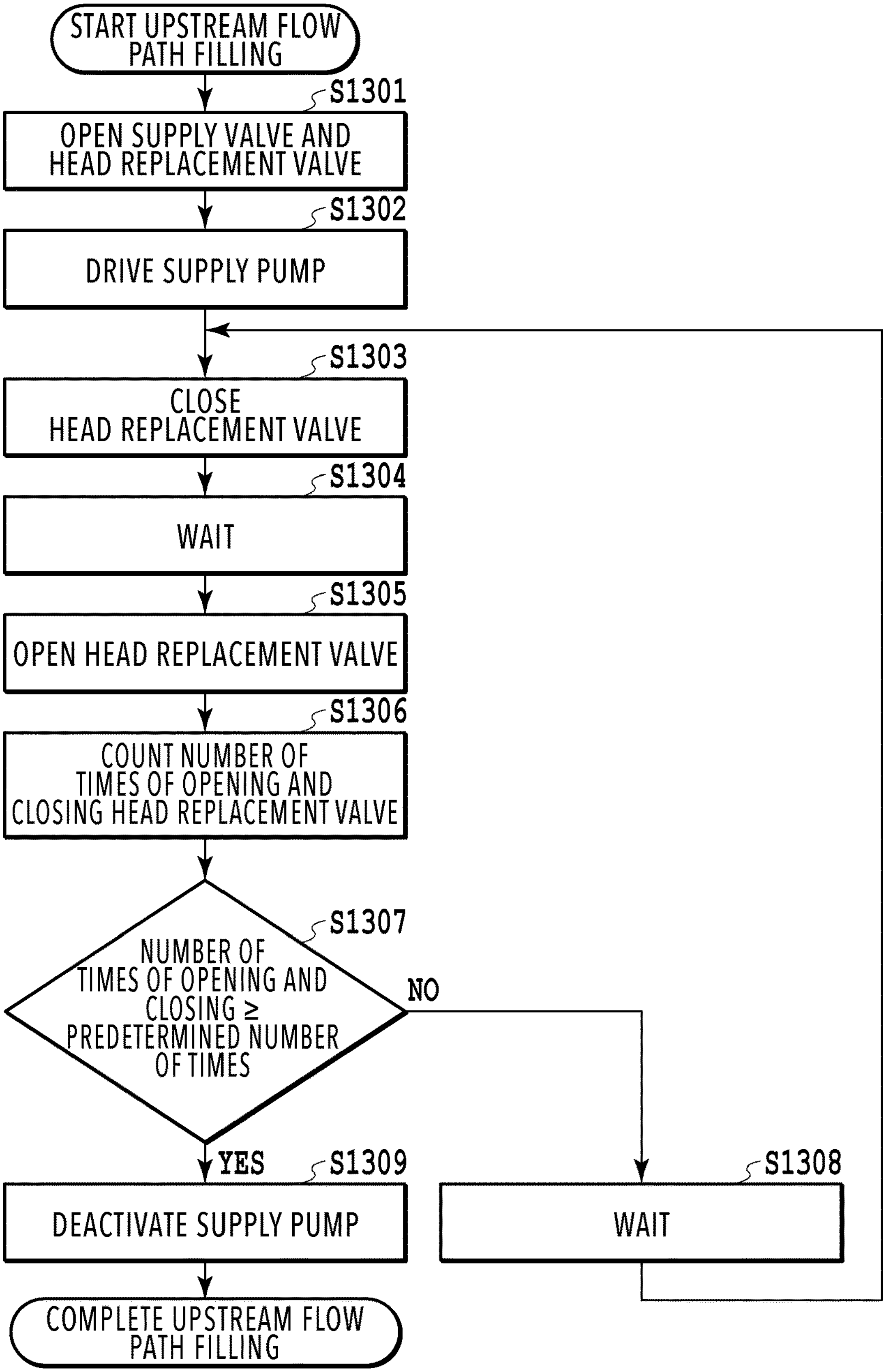
FIG. 13 is a flowchart of an ink filling process of a relief flow path.
Figures 14A, 14B, 14C, 14D, 14E, 14F, 14G:
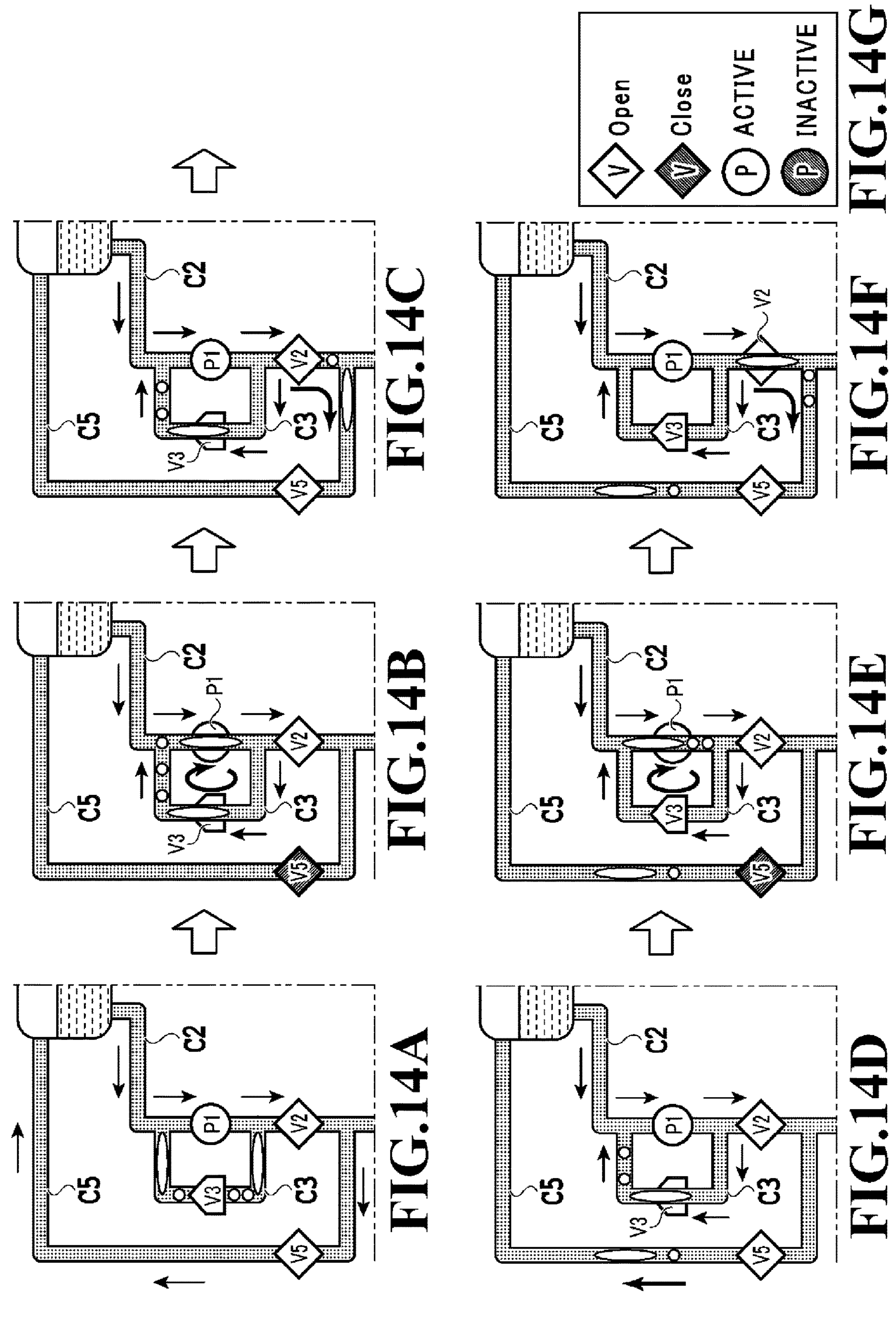

FIG. 13 is a flowchart of the ink filling process of the relief flow path C3. FIGS. 14A to 14F show states of the upstream flow path in the case of filling the relief flow path C3 with ink, and FIG. 14G is a legend explaining symbols used in FIGS. 14A to 14F.

First, in step S1301, the ink supply control unit 209 opens the supply valve V2 and the head replacement valve V5.

In step S1302, the ink supply control unit 209 drives the supply pump P1. FIG. 14A shows the upstream flow path in step S1302 in which the supply pump P1 is driven with the supply valve V2 and head replacement valve V5 opened. As illustrated, air bubbles remain in the relief flow path C3. Since the relief flow path C3 has the relief valve V3 for adjusting the amount of ink flow, a flow resistance in the relief flow path C3 is higher than that in the head replacement flow path C5 and ink is less prone to flow even though the supply pump P1 is driven with the head replacement valve V5 opened. As a result, air bubbles remain inside the relief flow path C3.

Next, in step S1303, the ink supply control unit 209 closes the head replacement valve V5. FIG. 14B shows the upstream flow path in step S1303 in which the head replacement valve V5 is closed. As illustrated, if the head replacement valve V5 is closed with the supply pump P1 driven, ink and air bubbles are circulated through the circulation flow path which consists of the relief flow path C3 and part of the supply flow path C2.

In step S1304, the ink supply control unit 209 waits a predetermined time with the head replacement valve V5 closed. In the present embodiment, the ink supply control unit 209 waits two seconds with the head replacement valve V5 closed.

In step S1305, the ink supply control unit 209 opens the head replacement valve V5. At this time, the supply pump P1 remains driven. FIG. 14C shows the upstream flow path with the head replacement valve V5 opened. As illustrated, opening the head replacement valve V5 allows air bubbles passing through the supply flow path C2 to flow into the head replacement flow path C5. At this time, since the negative pressure control units in the head unit 8 are closed, ink flows into the head replacement flow path C5 without flowing toward the head unit 8.

The supply pump P1 is continuously driven in the state of FIG. 14C, whereby air bubbles flowing through the head replacement flow path C5 move to the sub-tank 151 as shown in FIG. 14D and burst inside the sub-tank 151. In the present embodiment, air bubbles remaining inside the relief flow path C3 are removed in this manner.

In step S1306, the ink supply control unit 209 counts the number of times of opening and closing the head replacement valve V5. In this case, an operation (open/close operation) of closing and opening the head replacement valve V5 from step S1303 to step S1305 is regarded as one time and the cumulative number of times is counted.

In step S1307, the ink supply control unit 209 determines whether a predetermined number of open/close operations of the head replacement valve V5 have been performed. In the present embodiment, the predetermined number is preset to ten and stored in a storage device. If the number of open/close operations of the head replacement valve V5 is less than the predetermined number, the ink supply control unit 209 proceeds to step S1308. If the number of open/close operations of the head replacement valve V5 is not less than the predetermined number, the ink supply control unit 209 proceeds to step S1309.

In step S1308, the ink supply control unit 209 waits a predetermined time with the head replacement valve V5 opened. In the present embodiment, the ink supply control unit 209 waits two seconds with the head replacement valve V5 opened. After waiting the predetermined time, the ink supply control unit 209 returns to step S1303 to repeat the process.

FIG. 14E shows the upstream flow path with the head replacement valve V5 closed again after a lapse of the predetermined time. In this state, remaining air bubbles are circulated again through the circulation flow path. As shown in FIG. 14F, the head replacement valve V5 is opened after a lapse of a predetermined time. This allows remaining air bubbles to flow into the head replacement flow path C5 and burst in the sub-tank 151. According to the present embodiment, the open/close operation of the head replacement valve V5 is repeated a predetermined number of times at predetermined time intervals (that is, the head replacement valve V5 is opened and closed intermittently), thereby gradually removing air bubbles that cannot totally be removed by one open/close operation. In the present embodiment, an open/close operation of "opening two seconds and closing two seconds" the head replacement valve V5 is repeated ten times, but the present invention is not limited to this example.

In step S1309, the ink supply control unit 209 closes the head replacement valve V5, deactivates the supply pump P1, and finishes the filling process of the upstream flow path.

The open/close operation of the head replacement valve V5 may not necessarily be performed with the supply pump P1 driven. For example, the operation may be performed by driving the supply pump P1 with the head replacement valve V5 closed, temporarily deactivating the supply pump P1, opening the head replacement valve V5, and then driving the supply pump P1 again.

As described above, according to the relief flow path filling process of the present embodiment, air bubbles remaining in the relief flow path C3 can be removed by means of the head replacement flow path C5 (that is, by repeating the open/close operation of the head replacement valve V5).

Returning to FIG. 10, after the upstream flow path is completely filled with ink, the ink supply control unit 209 fills the head unit 8 with ink in step S1003. Two methods of filling the head unit 8 will be described below.

First Head Unit Filling Method

In a first head unit filling method, the head unit 8 is filled with ink by capping the head unit 8 and driving the decompression pump P0 of the sub-tank 151 while delivering ink by means of the supply pump P1.

Figure 15:
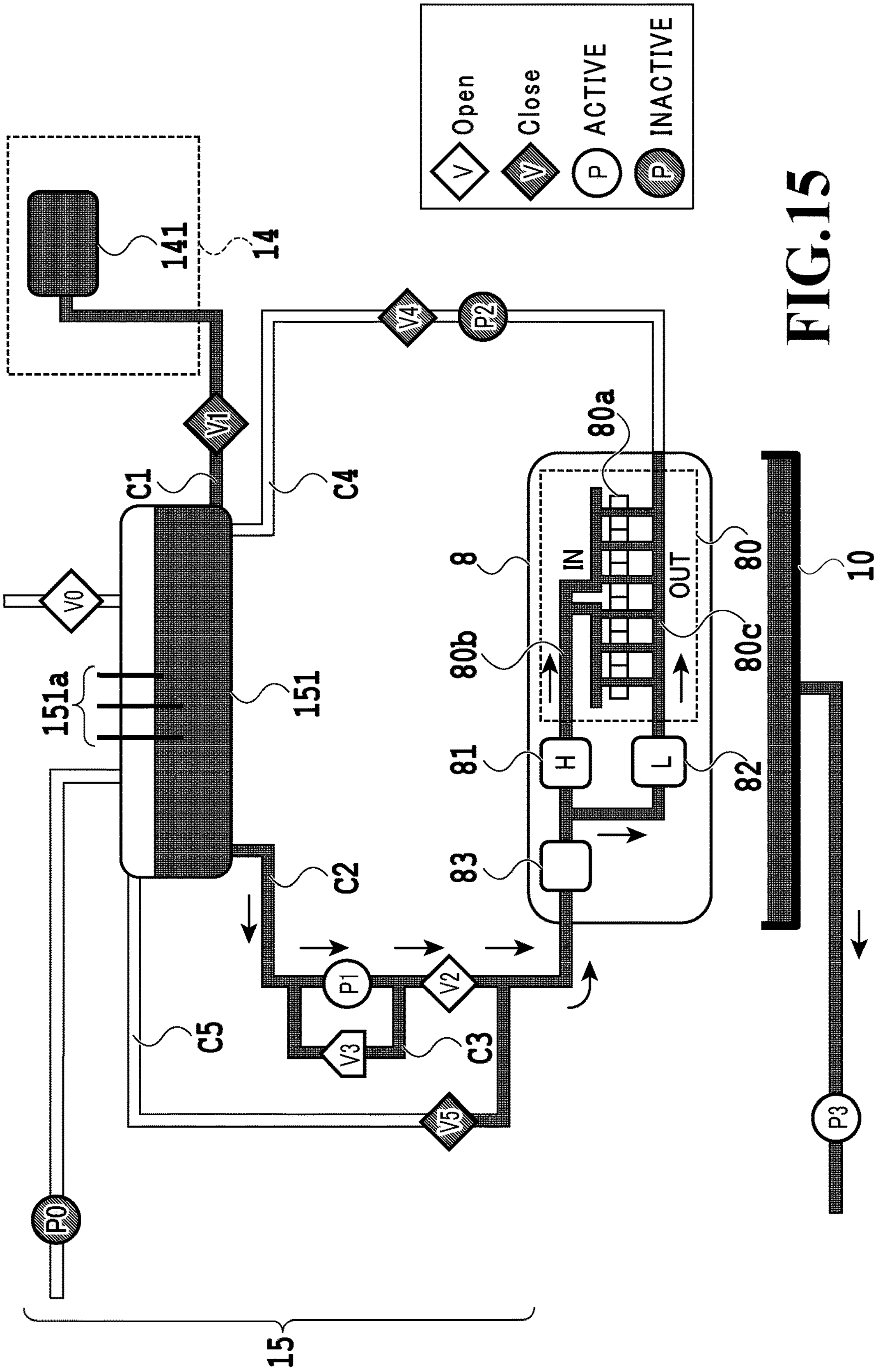
FIG. 15 is a diagram showing a state of the ink circulation system in the case of filling a head unit with ink.

FIG. 15 shows a state of the ink supply unit 15 in the case of filling the head unit 8 with ink according to the first head unit filling method. The supply pump P1 is driven after the upstream flow path is completely filled with ink. The head unit 8 is capped with the cap unit 10 and a decompression pump P3 of the cap unit 10 is driven. The decompression pump P0 of the sub-tank 151 and the decompression pump P3 of the cap unit 10 may be a single common pump. In the case of using the decompression pump P0 of the sub-tank 151 also as the decompression pump P3 of the cap unit 10, the decompression pump P0 is connected to each of the sub-tank 151 and the cap unit 10 and a valve is provided in each flow path. The opening and closing of these valves are controlled by the ink supply control unit 209, whereby the decompression pump P0 can function as a pump that decompresses each of the sub-tank 151 and the cap unit 10.

Figure 16:
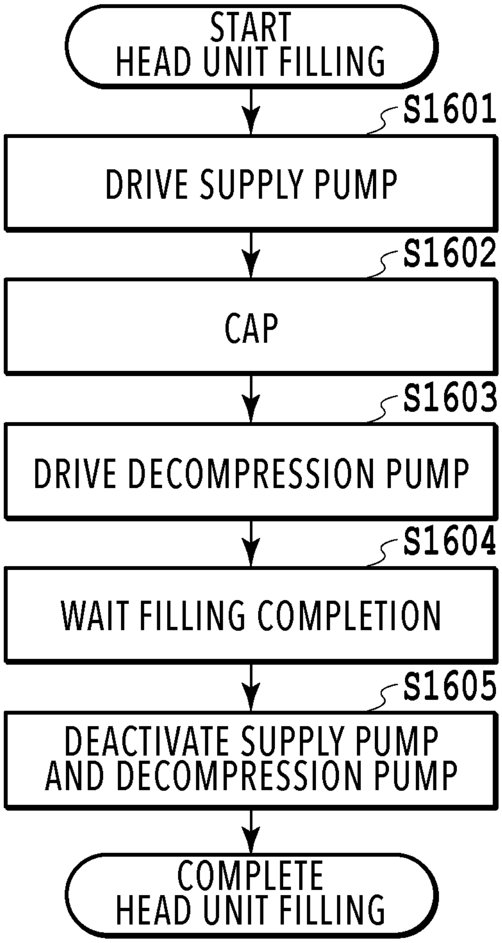
FIG. 16 is a flowchart of an ink filling process of the head unit according to a first head unit filling method.

FIG. 16 is a flowchart of a head unit ink filling process according to the first head unit filling method.

First, in step S1601, the ink supply control unit 209 drives the supply pump P1 to supply ink to the supply flow path C2 upstream of the head unit 8. At this time, the negative pressure control units in the head unit 8 are closed.

In step S1602, the ink supply control unit 209 caps the head unit 8 with the cap unit 10. That is, the ejection opening surface 8*a* of the head unit 8 is covered with the cap member 10*a* of the cap unit 10.

In step S1603, the ink supply control unit 209 drives the decompression pump P3 of the cap unit 10. More specifically, the ink supply control unit 209 creates a negative pressure inside the cap unit 10 while delivering ink by means of the supply pump P1. This negative pressure opens the negative pressure control units in the head unit 8 and draws ink to the ejection openings, thereby filling ink. The decompression pump P3 functions as a cap decompression pump for decompressing the inside of the cap unit 10. Decompressing the inside of the cap unit 10 means decompressing the inside of the cap.

In step S1604, the ink supply control unit 209 waits a predetermined time with the supply pump P1 and decompression pump P3 driven until the head unit 8 is completely filled with ink. (It should be noted that not only the case where the head unit 8 is completely filled with ink but also the amount of ink required for printing operation may be filled.) The predetermined waiting time until the completion of ink filling is preset.

In step S1605, the ink supply control unit 209 deactivates the supply pump P1 and the decompression pump P3 after a lapse of the predetermined time.

As described above, according to the first head unit filling method, the head unit 8 can be filled with ink in a short time by causing the decompression pump P3 to create a negative pressure inside the cap unit 10 while delivering ink by means of the supply pump P1. In other words, a force of the supply pump P1 for delivering ink and a force of the negative pressure inside the cap unit 10 for sucking ink are used to fill the head unit 8 with ink. This configuration enables short-time ink filling even in a case where a flow path from the sub-tank 151 to the head unit 8 is long and fluid resistance is high.

Second Head Unit Filling Method

In a second head unit filling method, the head unit 8 is filled with ink by capping the head unit 8, driving the decompression pump P3 to decompress the inside of the cap unit 10 and create a negative pressure, and then driving the supply pump P1. According to the second print head filling method, since the decompression pump P3 is deactivated and the supply pump P1 is driven after a negative pressure is created, the negative pressure inside the cap unit 10 and head unit 8 can be reduced as compared with the first print head filling method. Accordingly, it is possible to reduce a mixture of colors that may be made downstream of the head unit 8 at the time of releasing the negative pressure.

A state of the ink supply unit 15 in the case of filling ink according to the second head unit filling method is the same as that shown in FIG. 15. However, according to the present method, the head unit 8 is first capped and the supply pump P1 is driven after the decompression pump P3 is driven and the inside of the cap has a negative pressure.

Figure 17:
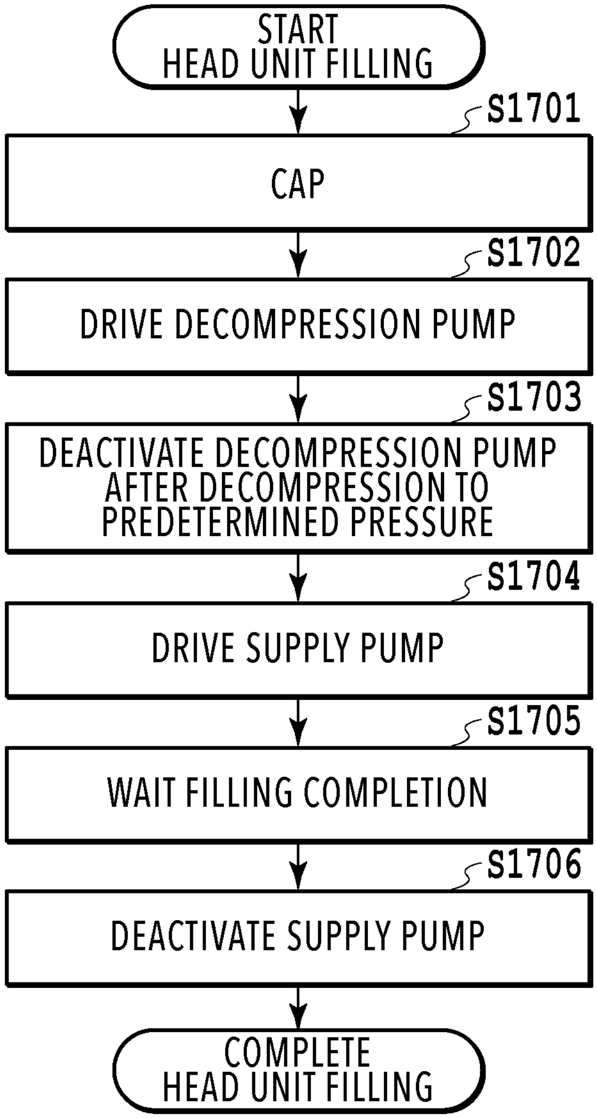
FIG. 17 is a flowchart of an ink filling process of the head unit according to a second head unit filling method.

FIG. 17 is a flowchart of a head unit filling process according to the second head unit filling method.

First, in step S1701, the ink supply control unit 209 caps the head unit 8 with the cap unit 10.

In step S1702, the ink supply control unit 209 drives the decompression pump P3 of the cap unit 10 to decompress the inside of the cap unit 10 and create a negative pressure.

In step S1703, after the inside of the cap unit 10 is decompressed to have a predetermined pressure, the ink supply control unit 209 deactivates the decompression pump P3. The ink supply control unit 209 may wait a preset/predetermined time until the inside of the cap unit 10 is decompressed to have the predetermined pressure. Alternatively, a pressure sensor that measures the pressure inside the cap unit 10 may be provided such that the ink supply control unit 209 deactivates the decompression pump P3 if the pressure becomes equal to the predetermined pressure. The predetermined pressure is a pressure at which the first negative pressure control unit 81 and the second negative pressure control unit 82 are controlled such that the negative pressure inside the cap unit 10 allows ink to flow through the head unit 8 from the common supply flow path 80*b* to the common collection flow path 80*c*. Each of the first negative pressure control unit 81 and the second negative pressure control unit 82 has a pressure regulating valve that is opened by application of a negative pressure from the cap unit 10 to the ejection openings. Upon the opening of the pressure regulating valve, flow paths from the sub-tank 151 to the ejection openings communicate with each other and driving of the decompression pump P3 starts ink flowing from the supply flow path C2 to the head unit 8.

In step S1704, the ink supply control unit 209 drives the supply pump P1 and supplies ink to the head unit 8. More specifically, the ink supply control unit 209 delivers ink by means of the supply pump P1 while using the negative pressure created inside the cap unit 10 to fill the head unit 8 with ink. The decompression pump P3 for decompressing the inside of the cap unit 10 is inactive.

In step S1705, the ink supply control unit 209 waits a predetermined time with the supply pump P1 driven until the head unit 8 is completely filled with ink. If the ejection openings are filled with ink along with the ink filling process, the negative pressure in the ejection openings is removed and the pressure regulating valves of the negative pressure control units are closed, which stops the ink flow through the head unit 8.

In step S1706, the ink supply control unit 209 deactivates the supply pump P1 after the head unit 8 is completely filled with ink.

As described above, according to the second head unit filling method, the head unit 8 is filled with ink by creating a negative pressure inside the cap unit 10, then deactivating the decompression pump P3, and driving the supply pump P1 using the negative pressure. Accordingly, it is possible to reduce the negative pressure inside the cap unit 10 and head unit 8 and reduce a mixture of colors that may be made downstream of the head unit 8 at the time of releasing the negative pressure as compared with the first head unit filling method.

Returning to FIG. 10, after the head unit 8 is completely filled with ink, the ink supply control unit 209 fills the collection flow path C4 with ink in step S1004. In the present embodiment, the decompression pump P0 of the sub-tank 151 is driven to decompress the sub-tank 151 and a negative pressure created in the sub-tank 151 is used to fill the collection flow path C4 with ink from the head unit 8.

Figure 18:
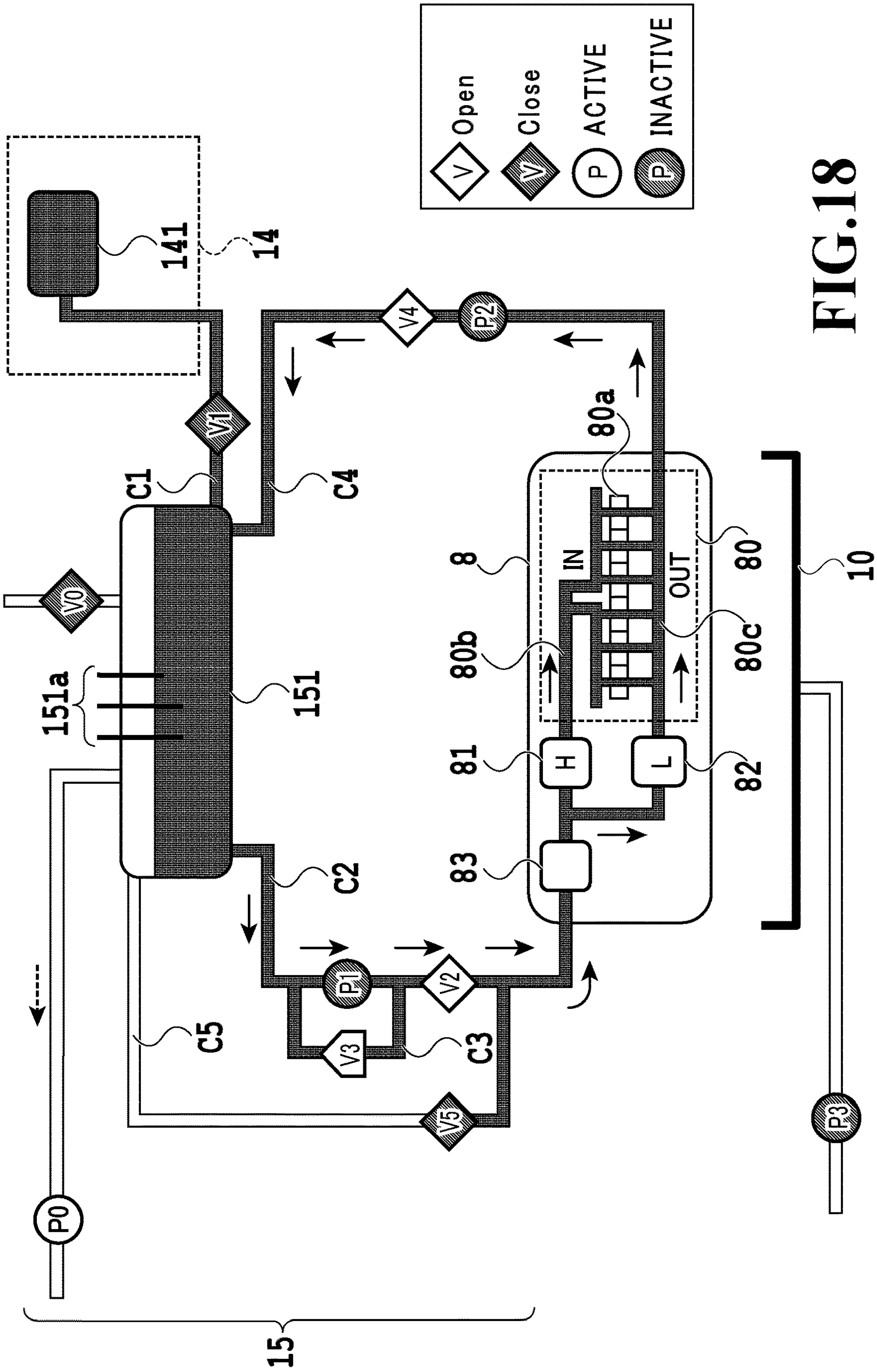
FIG. 18 is a diagram showing a state of the ink circulation system in the case of filling a collection flow path with ink.

FIG. 18 shows a state of the ink circulation system in the case of filling the collection flow path C4 with ink. After the head unit 8 is completely filled with ink, the decompression pump P0 of the sub-tank 151 is driven with the collection valve V4 opened and the air release valve V0 closed.

Figure 19:
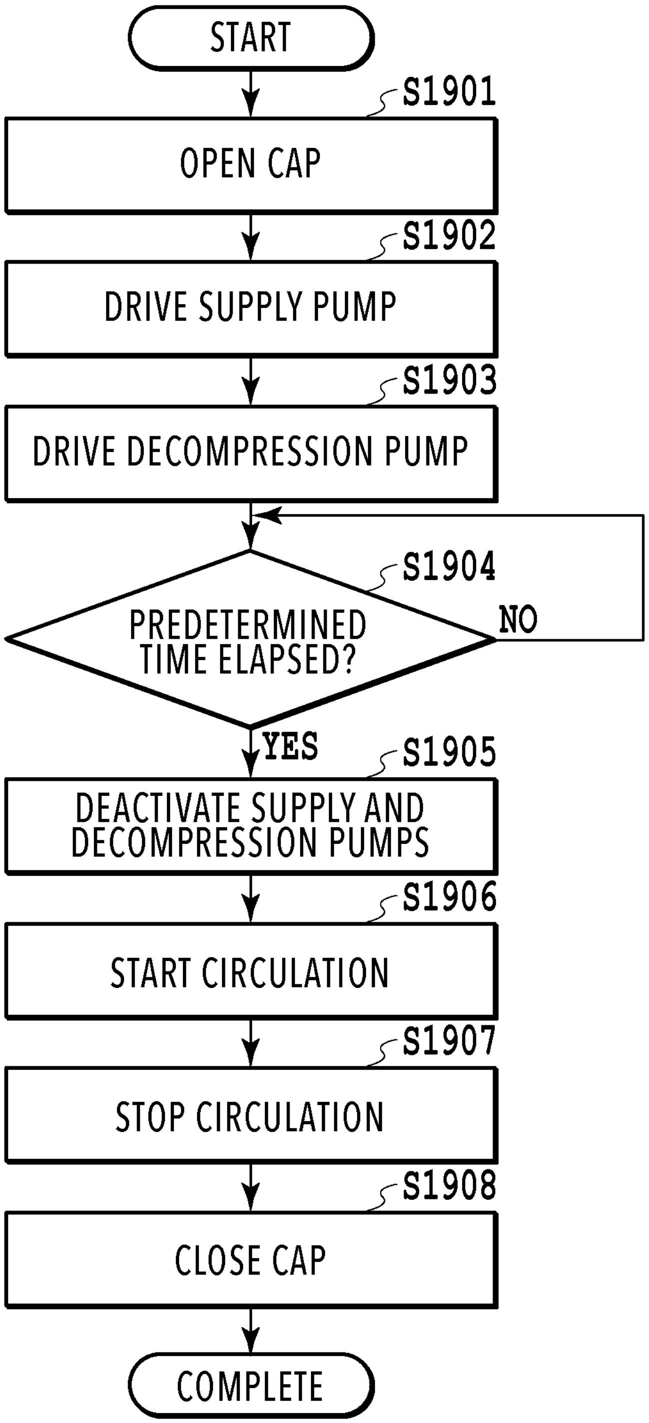
FIG. 19 is a flowchart of an ink filling process of the collection flow path.

FIG. 19 is a flowchart of an ink filling process of the collection flow path C4.

First, in step S1901, the maintenance control unit 210 separates the cap unit 10 from the ejection opening surface 8*a* of the head unit 8 and moves it down to the evacuation position, whereby the ejection openings are exposed to the air.

In step S1902 and step S1903, the ink supply control unit 209 drives the supply pump P1 and the decompression pump P0 of the sub-tank 151. At this time, the collection valve V4 is opened and the air release valve V0 is closed. Ink is supplied to the head unit 8 by driving the supply pump P1 and the collection flow path C4 is filled with ink from the head unit 8 using the negative pressure created inside the sub-tank 151 by driving the decompression pump P0. Driving of the supply pump P1 and the decompression pump P0 may be started together. Since the ejection opening surface 8*a* is exposed to the air in step S1901, the collection flow path C4 can be certainly decompressed by driving the decompression pump P0.

In step S1904, the ink supply control unit 209 continues driving the supply pump P1 and the decompression pump P0 for a predetermined time. After that, in step S1905, the ink supply control unit 209 stops driving the supply pump P1 and the decompression pump P0. Since ink is supplied by the supply pump P1 and filled by the decompression pump P0, at least a portion of the collection flow path C4 from the head unit 8 to the collection pump P2 is filled with ink. If ink reaches the collection pump P2, the rest of the collection flow path C4 from the collection pump P2 to the sub-tank 151 can be filled with ink by driving the collection pump P2. The supply pump P1 may be continuously driven from step S1905 to step S1906.

In step S1906, the ink supply control unit 209 drives the supply pump P1 and the collection pump P2 to start ink circulation. This enables the portion of the collection flow path C4 from the collection pump P2 to the sub-tank 151 to be certainly filled with ink. If a predetermined time has elapsed after the start of circulation, the ink supply control unit 209 deactivates the supply pump P1 and the collection pump P2 to stop ink circulation in step S1907. In step S1908, the maintenance control unit 210 covers the ejection opening surface 8*a* with the cap unit 10 to finish the process. In the refilling operation, steps S1901 to S1905 may be omitted so that the collection flow path C4 is filled with ink by driving the collection pump P2.

As described above, according to the ink filling process of the collection flow path C4 in the present embodiment, the negative pressure created in the sub-tank 151 can be used to fill the collection flow path C4 with ink from the head unit 8. In other words, the negative pressure created in the sub-tank 151 acts as a force for drawing ink from the head unit 8 to the collection flow path C4.

If the collection flow path C4 is filled before filling the head unit 8, the air is taken in from the ejection openings of the head unit 8. Thus, the collection flow path C4 is filled after filling the head unit 8 with ink.

Filling Process of Collection Flow Path in Single Decompression Pump Configuration The negative pressure created by decompressing the inside of the cap unit 10 in the head unit filling process according to the first head unit filling method described above can also be used to decompress the sub-tank 151 and fill the collection flow path C4.

Figure 20:
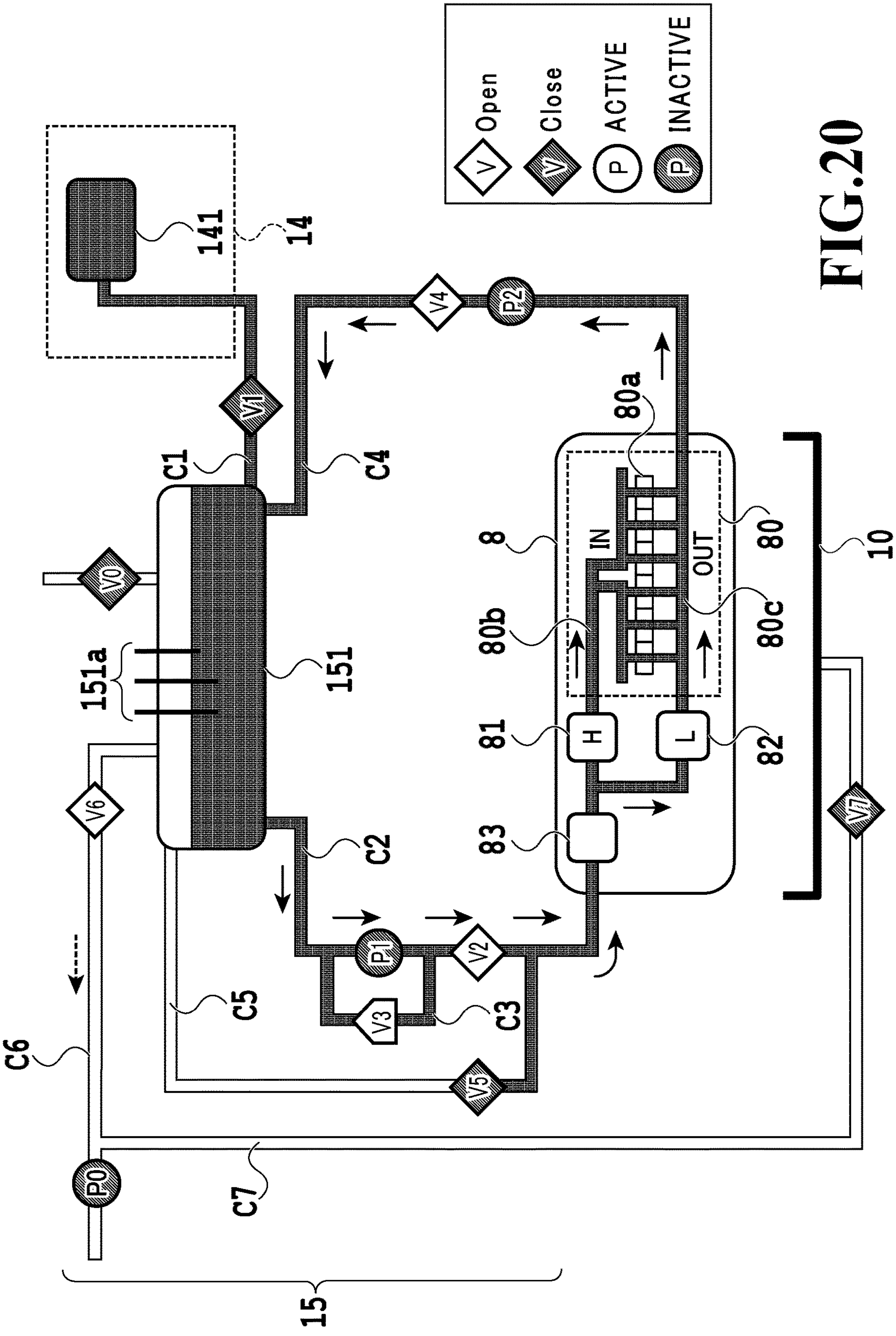
FIG. 20 is a diagram showing a state of the ink circulation system in the case of filling the collection flow path with ink.

FIG. 20 shows a state of the ink circulation system in the case of filling the collection flow path C4 with ink after the head unit 8 is completely filled with ink according to the first head unit filling method. The single decompression pump P0 has the function of decompressing the sub-tank 151 and the cap unit 10 (that is, the head unit 8). In this case, there are provided a flow path C6 connecting the decompression pump P0 to the sub-tank 151 and a flow path C7 connecting the decompression pump P0 to the cap unit 10. Further, the flow path C6 to the sub-tank 151 is equipped with a sub-tank decompression valve V6 and the flow path C7 to the cap unit 10 is equipped with a cap unit decompression valve V7. If the ink supply control unit 209 drives the decompression pump P0 with the sub-tank decompression valve V6 opened and the cap unit decompression valve V7 closed, the sub-tank 151 is decompressed. If the ink supply control unit drives the decompression pump P0 with the cap unit decompression valve V7 opened and the sub-tank decompression valve V6 closed, the cap unit 10 is decompressed. The following is description of a filling method of the collection flow path C4 in a case where the head unit 8 is filled with ink according to the first head unit filling method in the ink supply unit 15 having the above configuration.

Figure 21:
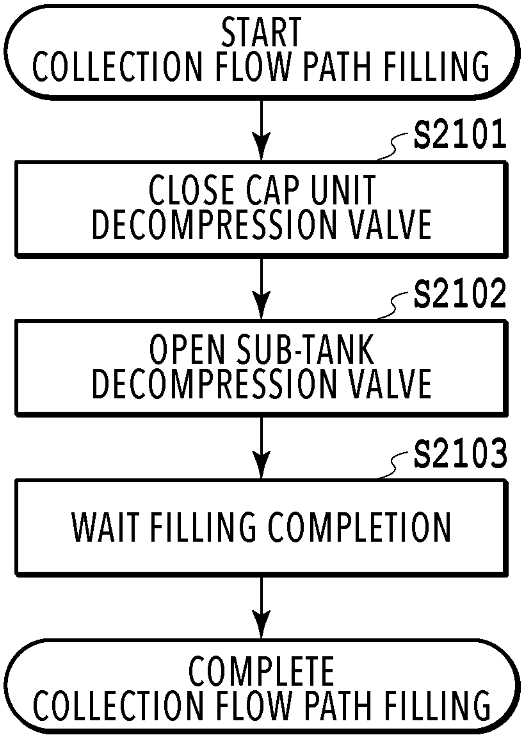
FIG. 21 is a flowchart of an ink filling process of the collection flow path.

FIG. 21 is a flowchart of an ink filling process of the collection flow path C4. It is assumed that the head unit 8 has been decompressed by driving the single decompression pump P0 and the head unit 8 has been completely filled with ink. Accordingly, before the process shown in the flowchart of FIG. 21, the cap unit decompression valve V7 is opened and the sub-tank decompression valve V6 is closed. Further, the decompression pump P0 is inactive. The ink filling process of the collection flow path C4 described below is performed subsequently to the head unit filling process in the first head unit filling method shown in FIG. 16.

First, in step S2101, the ink supply control unit 209 closes the cap unit decompression valve V7. That is, the cap unit 10 is disconnected from the decompression pump P0.

In step S2102, the ink supply control unit 209 opens the sub-tank decompression valve V6. That is, the flow path C6 connecting the decompression pump P0 to the sub-tank 151 is opened. As a result, the collection flow path C4 connecting the sub-tank 151 to the head unit 8 is decompressed using the negative pressure created for decompressing the inside of the cap.

As described above, the negative pressure created by the decompression pump P0 in the case of decompressing the inside of the cap unit 10 can be used to decompress the sub-tank 151 by controlling the opening and closing of the cap unit decompression valve V7 and sub-tank decompression valve V6. A negative pressure created by decompressing the sub-tank 151 allows ink to flow from the head unit 8 to the collection flow path C4.

In step S2103, the ink supply control unit 209 waits a predetermined time until the collection flow path C4 is completely filled with ink. The predetermined waiting time until the completion of ink filling is preset.

As described above, in the present embodiment, the negative pressure created in the case of decompressing the inside of the cap unit 10 may be used to decompress the sub-tank 151 in the single decompression pump configuration. Accordingly, the inside of the sub-tank 151 can be decompressed and the collection flow path C4 can be filled with ink only by controlling the opening and closing of the valves with the decompression pump P0 inactive.

In step S2102 described above, the speed of decompressing the sub-tank 151 may be accelerated by driving the decompression pump P0 in addition to opening the sub-tank decompression valve V6.

As described above, according to the present invention, ink can be filled in the inkjet printing apparatus having the configuration described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-133782, filed Jul. 7, 2017 which is hereby incorporated by reference wherein in its entirety.

What is claimed is:

1. An inkjet printing apparatus comprising:

an ink ejection unit having an ejection opening surface on which ejection openings for ejecting ink to a print medium are arranged in a direction intersecting a direction in which the print medium is conveyed, the ink being ejected at the time the print medium is being conveyed when the ink ejection unit prints an image on the print medium;

a tank storing the ink to be supplied to the ink ejection unit;

a supply flow path for supplying the ink from the tank to the ink ejection unit;

a supply pump provided in the supply flow path to supply the ink from the tank to the ink ejection unit;

a cap configured to cover the ejection opening surface;

a cap decompression pump connected to the cap and constructed to decompress the inside of the cap; and a control unit configured to control to drive the cap decompression pump while the ejection opening surface being covered with the cap to supply ink to the ink ejection unit which the ink has not loaded to.

2. The inkjet printing apparatus according to claim 1, further comprising a negative pressure control unit configured to exert negative pressure on ink in the ink ejection unit and disposed at the midstream of ink flow from the supply flow path to the ink ejection unit, wherein the control unit controls to drive the cap decompression pump to open the negative pressure control unit and communicate a flow path from the tank to the ejection openings.

3. The inkjet printing apparatus according to claim 2, wherein the control unit controls to drive the supply pump and the cap decompression pump while the ejection opening surface being covered with the cap to supply ink to the ink ejection unit through the negative pressure control unit.

4. The inkjet printing apparatus according to claim 3, wherein the control unit controls to drive the supply pump and the cap decompression pump with the ejection opening surface covered with the cap to supply ink to the ink ejection unit through the negative pressure control unit, after ink supplying operation of the supply flow path is completed.

5. The inkjet printing apparatus according to claim 3, wherein the control unit controls to drive the cap decompression pump after driving the supply pump to supply the ink to the supply flow path, for supplying ink to the ink ejection unit.

6. The inkjet printing apparatus according to claim 3, further comprising:

a first negative pressure control unit in the negative pressure unit;

a second negative pressure control unit in the negative pressure unit, in which a controlled negative pressure is greater than that in the first negative pressure control unit; and a first and a second common flow paths, wherein the first negative pressure control unit is connected to the first common flow path and the second negative pressure control unit is connected to the second common flow path, and the control unit controls to drive the cap decompression pump so as to open the first negative pressure control unit.

7. The inkjet printing apparatus according to claim 1, wherein the control unit controls to start driving the supply pump after starting driving the cap decompression pump, for supplying ink to the ink ejection unit.

8. The inkjet printing apparatus according to claim 7, wherein the control unit controls to stop driving the cap decompression pump and to start driving the supply pump after driving the cap decompression pump to decrease a pressure in the ink ejection unit to a predetermined pressure, for supplying the ink to the ink ejection unit.

9. The inkjet printing apparatus according to claim 1, further comprising:

a collection flow path for collecting the ink from the ink ejection unit to the tank; and a tank decompression pump which decompresses the inside of the tank, wherein the control unit control to drive the supply pump and the tank decompression pump to supply the ink to the collection flow path.

10. The inkjet printing apparatus according to claim 1, wherein the tank is a sub-tank storing the ink supplied from a main tank attachable to and detachable from the inkjet printing apparatus.

11. The inkjet printing apparatus according to claim 1, wherein the ink ejection unit is a line head in which the ejection openings corresponding to a width of a print medium are arrayed on the ejection opening surface.

12. The inkjet printing apparatus according to claim 1, further comprising:

a check valve provided in the supply flow path between the tank and the supply pump to prevent the ink from flowing from the supply pump to the tank; and a supply valve provided between the supply pump and the ink ejection unit, a collection flow path for collecting the ink from the ink ejection unit to the tank;

wherein before the supply flow path, the ink ejection unit, and the collection flow path are filled with the ink, the control unit controls to drive the cap decompression pump with the supply valve closed and the ejection opening surface covered with the cap to decompress the supply flow path to a predetermined pressure value, and then opens the supply valve to open the check valve.

13. The inkjet printing apparatus according to claim 1, further comprising a collection flow path through which the ink flows so that the ink which has passed through the supply flow path passes through the supply flow path again;

a collection pump provided on the collection flow path;

wherein the collection pump is not driven when the ink is loaded into the ejection unit where the ink has not been loaded by the cap decompression pump.

14. An inkjet printing apparatus comprising:

an ink ejection unit having an ejection opening surface on which ejection openings for ejecting ink to a print medium are arranged;

a tank storing the ink to be supplied to the ink ejection unit;

a supply flow path for supplying the ink from the tank to the ink ejection unit;

a supply pump provided in the supply flow path to supply the ink from the tank to the ink ejection unit;

a common supply flow path provided in the ink ejection unit to supply the ink which has passed through the supply flow path to the ejection opening;

a collection flow path through which the ink flows so that the ink which has passed through the supply flow path and the common supply flow path passes through the supply flow path again;

a cap configured to cover the ejection opening surface;

a cap decompression pump connected to the cap and constructed to decompress the inside of the cap; and a control unit configured to control to drive the cap decompression pump while the ejection opening surface being covered with the cap to supply ink to the ink ejection unit which the ink has not loaded to.

15. The inkjet printing apparatus according to claim 14, further comprising a negative pressure control unit configured to exert negative pressure on ink in the ink ejection unit and disposed at the midstream of ink flow from the supply flow path to the ink ejection unit, wherein the control unit controls to drive the cap decompression pump to open the negative pressure control unit and communicate a flow path from the tank to the ejection openings.

16. The inkjet printing apparatus according to claim 15, wherein the control unit controls to drive the supply pump and the cap decompression pump while the ejection opening surface being covered with the cap to supply ink to the ink ejection unit through the negative pressure control unit.

17. The inkjet printing apparatus according to claim 16, wherein the control unit controls to drive the supply pump and the cap decompression pump with the ejection opening surface covered with the cap to supply ink to the ink ejection unit through the negative pressure control unit, after ink supplying operation of the supply flow path is completed.

18. The inkjet printing apparatus according to claim 16, wherein the control unit controls to drive the cap decompression pump after driving the supply pump to supply the ink to the supply flow path, for supplying ink to the ink ejection unit.

19. The inkjet printing apparatus according to claim 16, further comprising:

a first negative pressure control unit in the negative pressure unit;

a second negative pressure control unit in the negative pressure unit, in which a controlled negative pressure is greater than that in the first negative pressure control unit; and a first and a second common flow paths, wherein the first negative pressure control unit is connected to the first common flow path and the second negative pressure control unit is connected to the second common flow path, and the control unit controls to drive the cap decompression pump so as to open the first negative pressure control unit.

20. The inkjet printing apparatus according to claim 14, wherein the control unit controls to start driving the supply pump after starting driving the cap decompression pump, for supplying ink to the ink ejection unit.

21. The inkjet printing apparatus according to claim 20, wherein the control unit controls to stop driving the cap decompression pump and to start driving the supply pump after driving the cap decompression pump to decrease a pressure in the ink ejection unit to a predetermined pressure, for supplying the ink to the ink ejection unit.

22. The inkjet printing apparatus according to claim 14, further comprising:

a collection flow path for collecting the ink from the ink ejection unit to the tank; and a tank decompression pump which decompresses the inside of the tank, wherein the control unit control to drive the supply pump and the tank decompression pump to supply the ink to the collection flow path.

23. The inkjet printing apparatus according to claim 14, wherein the tank is a sub-tank storing the ink supplied from a main tank attachable to and detachable from the inkjet printing apparatus.

24. The inkjet printing apparatus according to claim 14, wherein the ink ejection unit is a line head in which the ejection openings corresponding to a width of a print medium are arrayed on the ejection opening surface.

25. The inkjet printing apparatus according to claim 14, further comprising:

a check valve provided in the supply flow path between the tank and the supply pump to prevent the ink from flowing from the supply pump to the tank; and a supply valve provided between the supply pump and the ink ejection unit, a collection flow path for collecting the ink from the ink ejection unit to the tank;

wherein before the supply flow path, the ink ejection unit, and the collection flow path are filled with the ink, the control unit controls to drive the cap decompression pump with the supply valve closed and the ejection opening surface covered with the cap to decompress the supply flow path to a predetermined pressure value, and then opens the supply valve to open the check valve.

26. The inkjet printing apparatus according to claim 14, further comprising a collection pump provided on the collection flow path;

wherein the collection pump is not driven when the ink is loaded into the ejection unit where the ink has not been loaded by the cap decompression pump.

27. A control method of an inkjet printing apparatus, wherein the apparatus comprises:

an ink ejection unit having an ejection opening surface on which ejection openings for ejecting ink to a print medium are arranged in a direction intersecting a direction in which the print medium is conveyed, the ink being ejected at the time the print medium is being conveyed when the ink ejection unit prints an image on the print medium;

a tank storing ink to be supplied to the ink ejection unit;

a supply flow path for supplying the ink from the tank to the ink ejection unit; and a cap configured to cover the ejection opening surface;

wherein the control method comprises the step of:

driving a cap decompression pump while the ejection opening surface being covered with the cap to supply ink to the ink ejection unit which the ink has not loaded to.

28. A control method of an inkjet printing apparatus, wherein the apparatus comprises:

an ink ejection unit having an ejection opening surface on which ejection openings for ejecting ink to a print medium are arranged;

a tank storing ink to be supplied to the ink ejection unit;

a supply flow path for supplying the ink from the tank to the ink ejection unit;

a common supply flow path provided in the ink ejection unit to supply the ink which has passed through the supply flow path to the ejection opening;

a collection flow path through which the ink flows so that the ink which has passed through the supply flow path and the common supply flow path passes through the supply flow path again; and a cap configured to cover the ejection opening surface;

wherein the control method comprises the step of:

driving a cap decompression pump while the ejection opening surface being covered with the cap to supply ink to the ink ejection unit which the ink has not loaded to.

29. The inkjet printing apparatus according to claim 14, wherein the ink ejection unit has a printing element corresponding to the ejection opening for generating energy used for ejecting the liquid from the ejection opening and a pressure chamber communicating with the ejection opening and filled with the ink to be ejected from the ejection opening, the ink ejected from the ejection opening is supplied through the supply flow path, an inflow path, and the pressure chamber, and the collection flow path through which the ink flows so that the ink which has passed through the supply flow path, the common supply flow path and the pressure chamber passes through the supply flow path again.

30. The inkjet printing apparatus according to claim 29, wherein the ink ejection unit has a plurality of ejection openings, a plurality of printing elements, and a plurality of pressure chambers, and the printing elements and the pressure chambers are correspondingly provided in the ejection openings;

the inkjet printing apparatus comprises a plurality of individual supply flow paths provided in the ink ejection unit, each of the individual supply flow paths supplying the ink to the corresponding pressure chamber, respectively;

wherein the common supply flow path supplies the ink to the plurality of individual supply flow paths.

31. The inkjet printing apparatus according to claim 14, wherein the collection flow path is a flow path through which the ink which has exited from the ink ejection unit through the common supply flow path flows.

32. The inkjet printing apparatus according to claim 14, wherein the collection flow path is provided in the ink ejection unit and is a flow path through which the ink which has passed through the common supply flow path flows.

33. The inkjet printing apparatus according to claim 14, comprising a relief flow path being a flow path through which ink on a downstream side of the supply pump of the supply flow path flows to an upstream side of the supply pump.

34. The inkjet printing apparatus according to claim 14, comprises a main tank storing the ink to be supplied to the tank.

35. An inkjet printing apparatus comprising:

an ink ejection unit having an ejection opening surface on which ejection openings for ejecting ink to a print medium are arranged, a plurality of printing elements for generating energy used for ejecting the liquid from the ejection port, and a plurality of pressure chambers communicating with the ejection opening and filled with the ink ejected from the ejection opening, wherein the printing elements and the pressure chambers are provided to correspond to the ejection opening;

a tank storing the ink to be supplied to the ink ejection unit;

a supply flow path for supplying the ink from the tank to the ink ejection unit;

a plurality of individual supply flow paths provided in the ink ejection unit, each of the individual supply flow paths supplying the ink to the corresponding pressure chamber, respectively;

a common supply flow path provided in the ink ejection unit and supplying the ink which has passed through the supply flow path to the individual supply flow paths;

a collection flow path through which the ink flows so that the ink which has passed through the supply flow path, the common supply flow path, the individual supply flow paths, and the pressure chamber passes through the supply flow path, the common supply flow path, the individual supply flow paths, and the pressure chamber again;

a cap configured to cover the ejection opening surface;

a cap decompression pump connected to the cap and constructed to decompress the inside of the cap; and a control unit configured to control to drive the cap decompression pump while the ejection opening surface being covered with the cap to supply ink to the ink ejection unit which the ink has not loaded to.

36. The inkjet printing apparatus according to claim 35, further comprising a negative pressure control unit configured to exert negative pressure on ink in the ink ejection unit and disposed at the midstream of ink flow from the supply flow path to the ink ejection unit, wherein the control unit controls to drive the cap decompression pump to open the negative pressure control unit and communicate a flow path from the tank to the ejection openings.

37. The inkjet printing apparatus according to claim 36, comprising a supply pump provided in the supply flow path to supply the ink from the tank to the ink ejection unit;

wherein the control unit controls to drive the supply pump and the cap decompression pump while the ejection opening surface being covered with the cap to supply ink to the ink ejection unit through the negative pressure control unit.

38. The inkjet printing apparatus according to claim 37, comprising a supply pump provided in the supply flow path to supply the ink from the tank to the ink ejection unit;

wherein the control unit controls to drive the supply pump and the cap decompression pump with the ejection opening surface covered with the cap to supply ink to the ink ejection unit through the negative pressure control unit, after ink supplying operation of the supply flow path is completed.

39. The inkjet printing apparatus according to claim 36, wherein the control unit controls to drive the cap decompression pump after driving the supply pump to supply the ink to the supply flow path, for supplying ink to the ink ejection unit.

40. The inkjet printing apparatus according to claim 37, further comprising:

a first negative pressure control unit in the negative pressure unit;

a second negative pressure control unit in the negative pressure unit, in which a controlled negative pressure is greater than that in the first negative pressure control unit; and a first and a second common flow paths, wherein the first negative pressure control unit is connected to the first common flow path and the second negative pressure control unit is connected to the second common flow path, and the control unit controls to drive the cap decompression pump so as to open the first negative pressure control unit.

41. The inkjet printing apparatus according to claim 35, comprising a supply pump provided in the supply flow path to supply the ink from the tank to the ink ejection unit;

wherein the control unit controls to start driving the supply pump after starting driving the cap decompression pump, for supplying ink to the ink ejection unit.

42. The inkjet printing apparatus according to claim 41, wherein the control unit controls to stop driving the cap decompression pump and to start driving the supply pump after driving the cap decompression pump to decrease a pressure in the ink ejection unit to a predetermined pressure, for supplying the ink to the ink ejection unit.

43. The inkjet printing apparatus according to claim 35, further comprising:

a supply pump provided in the supply flow path to supply the ink from the tank to the ink ejection unit;

a collection flow path for collecting the ink from the ink ejection unit to the tank; and a tank decompression pump which decompresses the inside of the tank, wherein the control unit control to drive the supply pump and the tank decompression pump to supply the ink to the collection flow path.

44. The inkjet printing apparatus according to claim 35, wherein the tank is a sub-tank storing the ink supplied from a main tank attachable to and detachable from the inkjet printing apparatus.

45. The inkjet printing apparatus according to claim 35, wherein the ink ejection unit is a line head in which the ejection openings corresponding to a width of a print medium are arrayed on the ejection opening surface.

46. The inkjet printing apparatus according to claim 35, further comprising:

a check valve provided in the supply flow path between the tank and the supply pump to prevent the ink from flowing from the supply pump to the tank; and a supply valve provided between the supply pump and the ink ejection unit, a collection flow path for collecting the ink from the ink ejection unit to the tank;

wherein before the supply flow path, the ink ejection unit, and the collection flow path are filled with the ink, the control unit controls to drive the cap decompression pump with the supply valve closed and the ejection opening surface covered with the cap to decompress the supply flow path to a predetermined pressure value, and then opens the supply valve to open the check valve.

47. The inkjet printing apparatus according to claim 35, wherein the collection flow path is a flow path through which the ink which has exited from the ink ejection unit through the common supply flow path flows.

48. The inkjet printing apparatus according to claim 35, wherein the collection flow path is provided in the ink ejection unit and is a flow path through which the ink which has passed through the common supply flow path flows.

49. The inkjet printing apparatus according to claim 35, comprising a relief flow path being a flow path through which ink on a downstream side of the supply pump of the supply flow path flows to an upstream side of the supply pump.

50. The inkjet printing apparatus according to claim 35, comprises a main tank storing the ink to be supplied to the tank.

51. The inkjet printing apparatus according to claim 35, wherein the ink ejection unit having an ejection opening surface on which ejection openings for ejecting ink to a print medium are arranged in a direction intersecting a direction in which the print medium is conveyed, the ink being ejected at the time the print medium is being conveyed when the ink ejection unit prints an image on the print medium.

52. A control method of an inkjet printing apparatus, wherein the apparatus comprises:

an ink ejection unit having an ejection opening surface on which ejection openings for ejecting ink to a print medium are arranged, a plurality of printing elements for generating energy used for ejecting the liquid from the ejection port, and a plurality of pressure chambers communicating with the ejection opening and filled with the ink ejected from the ejection opening, wherein the printing elements and the pressure chambers are provided to correspond to the ejection opening;

a tank storing the ink to be supplied to the ink ejection unit;

a supply flow path for supplying the ink from the tank to the ink ejection unit;

a plurality of individual supply flow paths provided in the ink ejection unit, each of the individual supply flow paths supplying the ink to the corresponding pressure chamber, respectively;

a common supply flow path provided in the ink ejection unit and supplying the ink which has passed through the supply flow path to the individual supply flow paths;

a collection flow path through which the ink flows so that the ink which has passed through the supply flow path, the common supply flow path, the individual supply flow paths, and the pressure chamber passes through the supply flow path, the common supply flow path, the individual supply flow paths, and the pressure chamber again;

a cap configured to cover the ejection opening surface; and a cap decompression pump connected to the cap and constructed to decompress the inside of the cap;

wherein the control method comprises the step of:

driving the cap decompression pump while the ejection opening surface being covered with the cap to supply ink to the ink ejection unit which the ink has not loaded to.

53. The inkjet printing apparatus according to claim 14, wherein the ink ejection unit having an ejection opening surface on which ejection openings for ejecting ink to a print medium are arranged in a direction intersecting a direction in which the print medium is conveyed, the ink being ejected at the time the print medium is being conveyed when the ink ejection unit prints an image on the print medium.

* * * * *